United States Patent
Goto et al.

(10) Patent No.: US 10,792,916 B2
(45) Date of Patent: Oct. 6, 2020

(54) INKJET PRINTING METHOD AND INKJET PRINTING APPARATUS

(71) Applicant: CANON KABUSHIKI KAISHA, Tokyo (JP)

(72) Inventors: Fumitaka Goto, Tokyo (JP); Hiromitsu Yamaguchi, Yokohama (JP); Yuto Kajiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/436,990

(22) Filed: Jun. 11, 2019

(65) Prior Publication Data

US 2019/0381791 A1 Dec. 19, 2019

(30) Foreign Application Priority Data

Jun. 13, 2018 (JP) ................. 2018-113068

(51) Int. Cl.
- *B41J 2/045* (2006.01)
- *B41J 2/21* (2006.01)
- *G06K 15/10* (2006.01)

(52) U.S. Cl.
CPC ....... *B41J 2/04573* (2013.01); *B41J 2/04586* (2013.01); *B41J 2/2107* (2013.01); *B41J 2/211* (2013.01); *G06K 15/105* (2013.01)

(58) Field of Classification Search
CPC ...... B41J 2/2107; B41J 2/2121; B41J 2/2132; B41J 2/04508; B41J 2/04573; B41J 2/04586; B41J 2/04593; B41J 2/04595; B41J 25/006; G06K 15/105

See application file for complete search history.

(56) References Cited

U.S. PATENT DOCUMENTS

| | | |
|---|---|---|
| 4,636,805 A | 1/1987 | Toganoh et al. |
| 5,635,291 A | 6/1997 | Yoshino et al. |
| 5,800,916 A | 9/1998 | Yoshino et al. |

(Continued)

FOREIGN PATENT DOCUMENTS

| | | |
|---|---|---|
| JP | S61-10483 A | 1/1986 |
| JP | H07-232473 A | 9/1995 |

(Continued)

OTHER PUBLICATIONS

U.S. Appl. No. 16/386,568, Hiromitsu Yamaguchi, Fumitaka Goto, Yuto Kajiwara, filed Apr. 17, 2019.

*Primary Examiner* — Thinh H Nguyen
(74) *Attorney, Agent, or Firm* — Venable LLP

(57) ABSTRACT

In a first printing step, metallic ink is applied to a color metallic area where a color metallic image on a print medium having a receiving layer containing a dye coagulating agent for coagulating a dye is formed, while moving the print head in a main-scanning direction. In a conveyance step, a print medium is conveyed by a predetermined distance in a conveyance direction crossing the main-scanning direction, after the first printing step. In a second printing step, a first color ink is applied to the color metallic area while moving the print head in the main-scanning direction. an application time difference until application of the first color ink to the color metallic area in the second printing step after application of the metallic ink to the color metallic area in the first printing step is included in a target range regardless of the image data.

12 Claims, 23 Drawing Sheets

(56) References Cited

U.S. PATENT DOCUMENTS

| | | |
|---|---|---|
| 5,846,647 A | 12/1998 | Yoshino et al. |
| 5,851,654 A | 12/1998 | Yoshino et al. |
| 5,869,177 A | 2/1999 | Yoshino et al. |
| 5,955,185 A | 9/1999 | Yoshino et al. |
| 5,962,124 A | 10/1999 | Yoshino et al. |
| 5,965,252 A | 10/1999 | Santo et al. |
| 6,342,289 B1 | 1/2002 | Eguchi et al. |
| 6,558,740 B1 | 5/2003 | Santo et al. |
| 6,649,661 B2 | 11/2003 | Yoshino et al. |
| 7,144,613 B2 | 12/2006 | Eguchi et al. |
| 7,416,639 B2 | 8/2008 | Yoshino et al. |
| 8,529,043 B2 * | 9/2013 | Kakutani ............. B41J 2/14201 347/100 |
| 2010/0053247 A1 | 3/2010 | Kakutani |
| 2013/0271520 A1 | 10/2013 | Kakutani |
| 2018/0281446 A1 * | 10/2018 | Kayanaka .............. B41J 2/2135 |

FOREIGN PATENT DOCUMENTS

| | | |
|---|---|---|
| JP | H08-132731 A | 5/1996 |
| JP | H09-66664 A | 3/1997 |
| JP | H09-76628 A | 3/1997 |
| JP | 5434015 B2 | 3/2014 |

* cited by examiner

| ITEMS | OPERATION OF PRINT HEAD | | | | |
|---|---|---|---|---|---|
| | A | B | C | D | E |
| MAIN-SCANNING WIDTH (inch) | 12.0 | 5.0 | 5.0 | 5.0 | 5.0 |
| MAIN-SCANNING SPEED (inch/sec.) | 12.0 | 12.0 | 8.0 | 5.0 | 2.5 |
| MAIN-SCANNING TIME (sec.) | 1.0 | 0.4 | 0.6 | 1.0 | 2.0 |
| NUMBER OF NON-PRINT SCANNINGS (TIMES) | 3 | 3 | 3 | 3 | 1 |
| NON-PRINT SCANNING TIME (sec.) | 3.0 | 1.3 | 1.9 | 3.0 | 2.0 |
| BASIC APPLICATION TIME DIFFERENCE (sec.) | 4.0 | 1.7 | 2.5 | 4.0 | 4.0 |
| INTER-SCANNING HEAD PAUSE TIME (sec.) | 0.0 | 0.0 | 0.0 | 0.0 | 0.0 |
| TOTAL HEAD PAUSE TIME (sec.) | 0.0 | 0.0 | 0.0 | 0.0 | 0.0 |
| ACTUAL APPLICATION TIME DIFFERENCE (sec.) | 4.0 | 1.7 | 2.5 | 4.0 | 4.0 |

FIG.13

| ITEMS | OPERATION OF PRINT HEAD | | | | | | | |
| --- | --- | --- | --- | --- | --- | --- | --- | --- |
| | A | G | H | I | J | K | L | M |
| MAIN-SCANNING WIDTH (inch) | 12.0 | 12.0 | 12.0 | 12.0 | 12.0 | 12.0 | 12.0 | 12.0 |
| MAIN-SCANNING SPEED (inch/sec.) | 12.0 | 12.0 | 12.0 | 12.0 | 24.0 | 24.0 | 24.0 | 24.0 |
| MAIN-SCANNING TIME (sec.) | 1.0 | 1.0 | 1.0 | 1.0 | 0.5 | 0.5 | 0.5 | 0.5 |
| NUMBER OF NON-PRINT SCANNINGS (TIMES) | 3 | 3 | 1 | 1 | 7 | 7 | 1 | 1 |
| NON-PRINT SCANNING TIME (sec.) | 3.0 | 3.0 | 1.0 | 1.0 | 3.5 | 3.5 | 0.5 | 0.5 |
| BASIC APPLICATION TIME DIFFERENCE (sec.) | 4.0 | 4.0 | 2.0 | 2.0 | 4.0 | 4.0 | 1.0 | 1.0 |
| INTER-SCANNING HEAD PAUSE TIME (sec.) | 0.0 | 1.0 | 1.0 | 0.5 | 0.0 | 1.5 | 1.5 | 2.0 |
| TOTAL HEAD PAUSE TIME (sec.) | 0.0 | 4.0 | 2.0 | 1.0 | 0.0 | 12.0 | 3.0 | 4.0 |
| ACTUAL APPLICATION TIME DIFFERENCE (sec.) | 4.0 | 8.0 | 4.0 | 3.0 | 4.0 | 16.0 | 4.0 | 5.0 |

FIG.16

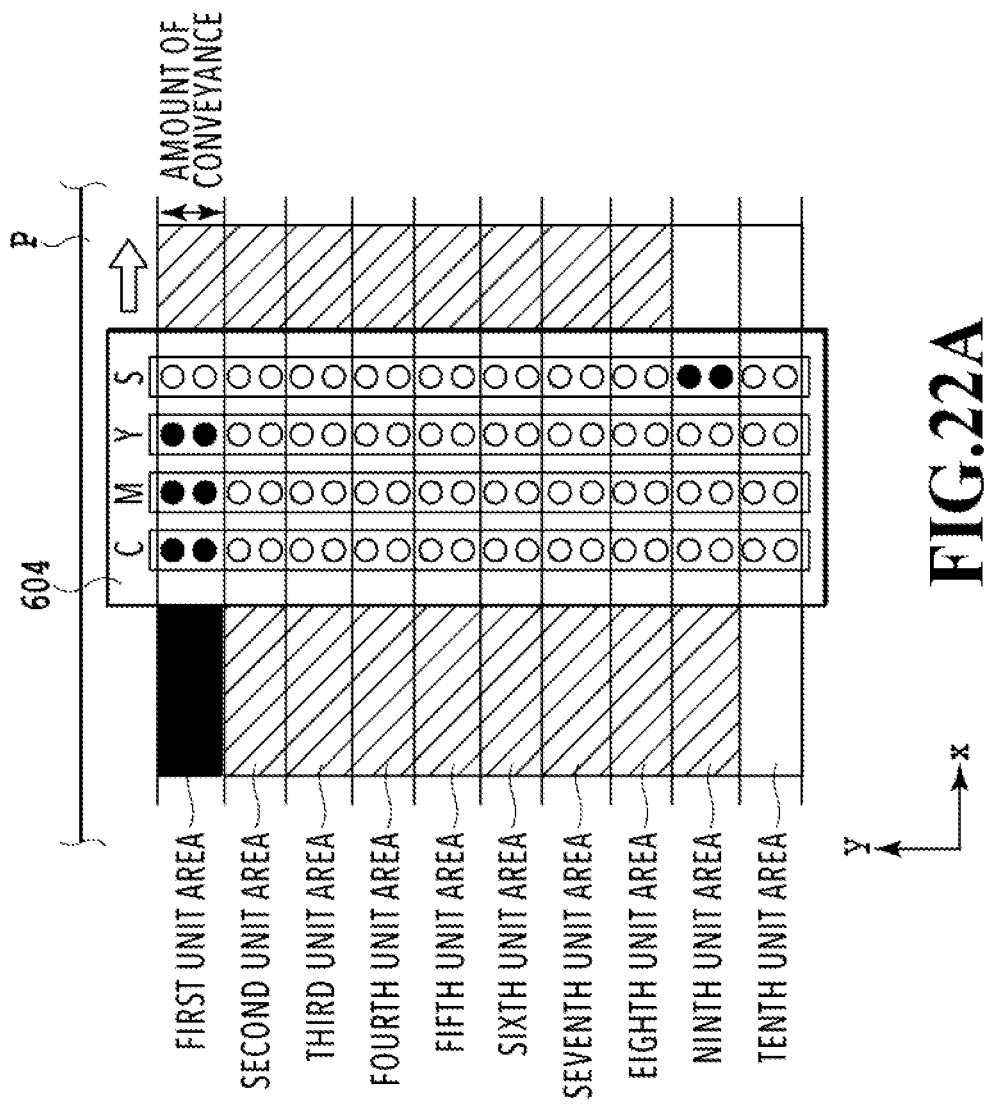
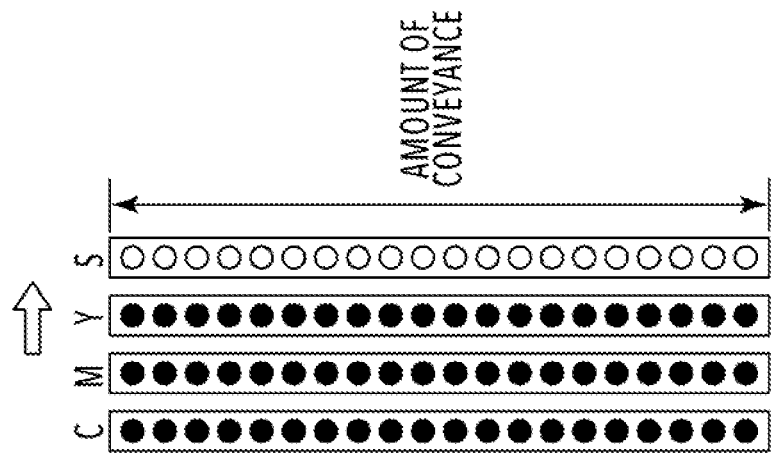
FIG.22A
FIG.22B

INKJET PRINTING METHOD AND INKJET PRINTING APPARATUS

BACKGROUND OF THE INVENTION

Field of the Invention

The present invention relates to an inkjet printing method and an inkjet printing apparatus.

Description of the Related Art

Japanese Patent No. 5434015 discloses a serial type inkjet printing apparatus that prints a metallic color image by using special glossy ink containing a metallic component and color ink containing a color material. According to Japanese Patent No. 5434015, metallic color with metallic glossiness is expressed by varying the timing at which special glossy ink and color ink are applied to a unit area of a print medium by shifting a use area of a nozzle array in the sub-scanning direction for the special glossy ink and the color ink However, in a case where a dye fixing agent is contained in a print medium, the dye fixing agent may influence the permeation of a color material of ink, which may affect the coloring property. The invention disclosed in the Japanese Patent No. 5434015 does not take a dye fixing agent into consideration, and thus lacks consideration on the influence of such a dye fixing agent on an image, so that preferable coloring may not be obtained on a print medium containing a dye fixing agent.

SUMMARY OF THE INVENTION

The present invention has been made to solve the above problem. Accordingly, it is an object of the present invention to provide an inkjet printing apparatus capable of expressing a preferable metallic color on a print medium containing a dye fixing agent.

According to a first aspect of the present invention, there is provided an inkjet printing method comprising: a first printing step of, by using a print head including a printing element for applying metallic ink containing metal particles and a printing element for applying a first color ink containing a color material of a dye, based on image data including a color metallic image, applying the metallic ink to a color metallic area where the color metallic image on a print medium having a receiving layer containing a dye coagulating agent for coagulating a dye is formed, while moving the print head in a main-scanning direction; a conveyance step of, after the first printing step, conveying the print medium by a predetermined distance in a conveyance direction crossing the main-scanning direction; and a second printing step of, after the conveyance step, applying the first color ink to the color metallic area while moving the print head in the main-scanning direction, wherein an application time difference until application of the first color ink to the color metallic area in the second printing step after application of the metallic ink to the color metallic area in the first printing step is included in a target range regardless of the image data.

According to a second aspect of the present invention, there is provided an inkjet printing apparatus comprising: a conveyance unit configured to be capable of conveying a print medium having a receiving layer containing a dye coagulating agent for coagulating a dye; a print head configured to include a printing element for applying metallic ink containing metal particles and a printing element for applying color ink containing a color material of a dye; and a control unit configured to control operation of printing an image with the print head and the conveyance unit in such a way that, based on image data including a color metallic image, after the metallic ink is applied to an area on the print medium where the color metallic image is formed through a first print scan, the color ink is applied to the area through a second print scan, and that an application time difference between execution of the first print scan and execution of the second print scan is included in a target range regardless of the image data.

Further features of the present invention will become apparent from the following description of exemplary embodiments with reference to the attached drawings.

BRIEF DESCRIPTION OF THE DRAWINGS

FIG. 13 is a diagram showing a specific example of print operation adoptable in a first exemplary embodiment;

FIG. 16 is a diagram showing a specific example of print operation adoptable in a second exemplary embodiment;

FIGS. 22A and 22B are diagrams showing different examples of multi-pass printing.

DESCRIPTION OF THE EMBODIMENTS

The following will describe embodiments according to the present invention with reference to the accompanying drawings in detail.

(Schematic Description of Printer)

Figure 1:
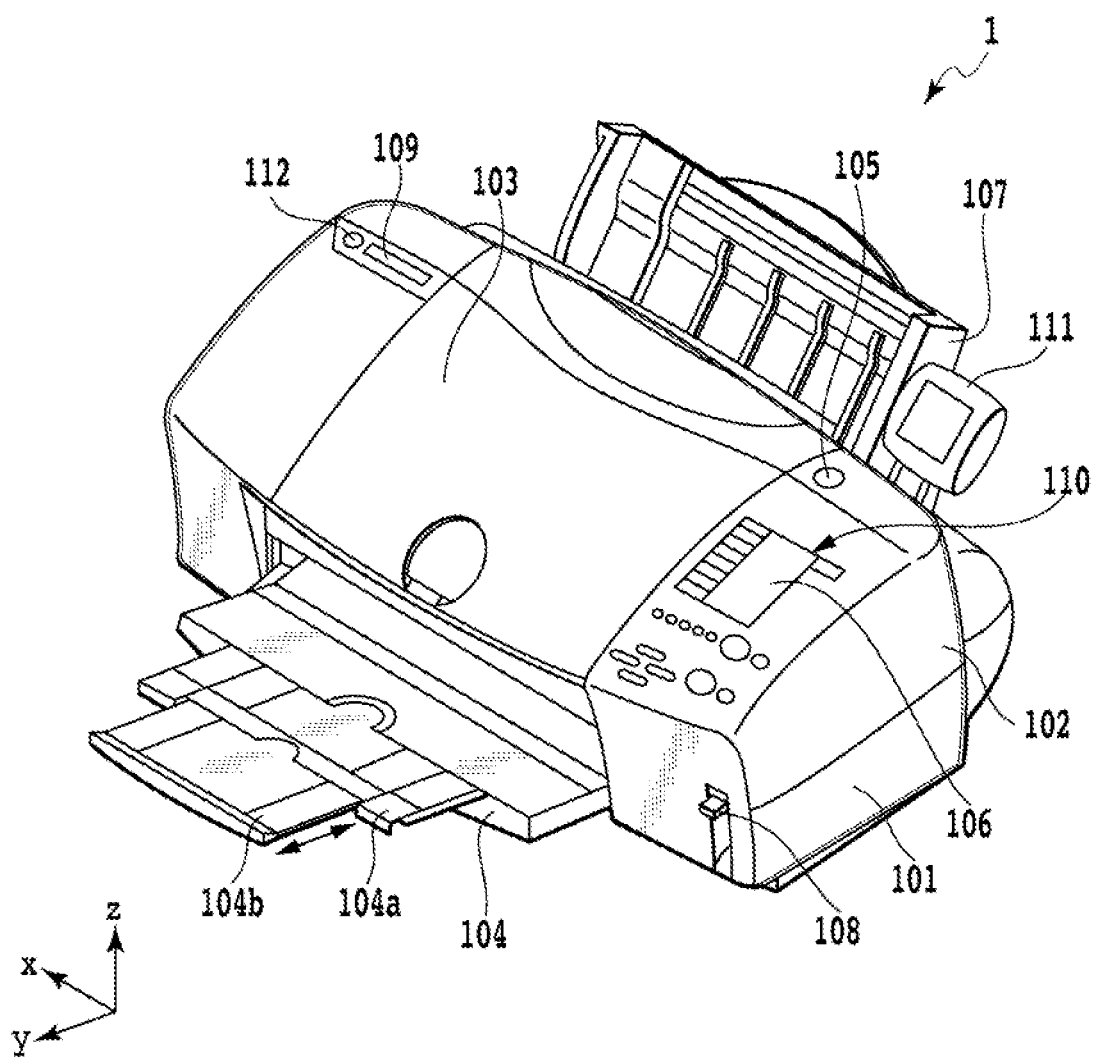
FIG. 1 is a perspective view of an inkjet printing apparatus.

FIG. 1 is an external perspective view of an inkjet printing apparatus 1 (hereinafter simply referred to as "printing apparatus 1") usable in the present invention. The printing apparatus 1 includes as exterior members a lower case 101, an upper case 102, an access cover 103, a discharging tray 104, and a feeding unit 107. Individual mechanisms for printing an image are housed in internal space formed by the lower case 101 and the upper case 102.

The feeding unit 107 which holds a stack of print media prior to printing and automatically feeds the print media is disposed on the back side (−y-directional side) of the printing apparatus 1. The discharging tray 104 which guides print media after printing and holds a stack of the print media is disposed on the front side (+y-directional side) of the printing apparatus 1.

One end of the discharging tray 104 is rotatably held on the lower case 101, so that an opening portion provided in the front side of the lower case 101 is opened or closed according to the rotation of the discharging tray 104. Two auxiliary trays 104a and 104b are retracted in the discharging tray 104 such that a support area for print media is expanded or reduced in three stages as needed.

One end of the access cover 103 is rotatably held on the upper case 102, so that a top opening of the upper case 102 is openable/closable. A user can replace a print head and an ink tank housed inside the apparatus by opening the access cover 103. A paper gap lever 108 is a lever for adjusting the distance between an ejection opening surface of the print head and a print medium.

The printing apparatus 1 of the present embodiment can receive image data to be printed from various external devices. For example, a USB connector 113 (see FIG. 3) to connect to a personal computer (PC) 400 is provided on the back side of the apparatus. A card slot 109 is configured such that an adapter on which a memory card such as compact flash (registered trademark) memory, smart medium or memory stick is mounted is insertable into the card slot 109. A USB terminal 112 is a terminal to connect to a digital camera. Further, a Wi-Fi (registered trademark) device 315 (see FIG. 3) for wireless connection to a smartphone, a tablet terminal or the like is provided inside the printing apparatus 1.

A viewer (liquid crystal display unit) 111 displays plural pieces of image data stored in a memory card or a digital camera. A user can search for or select image data to be printed by the printing apparatus 1 while checking images displayed on the viewer 111. Arranged on the top surface of the upper case 102 are a power key 105 as well as an operating panel 110 including a liquid crystal display unit 106.

Figure 2:
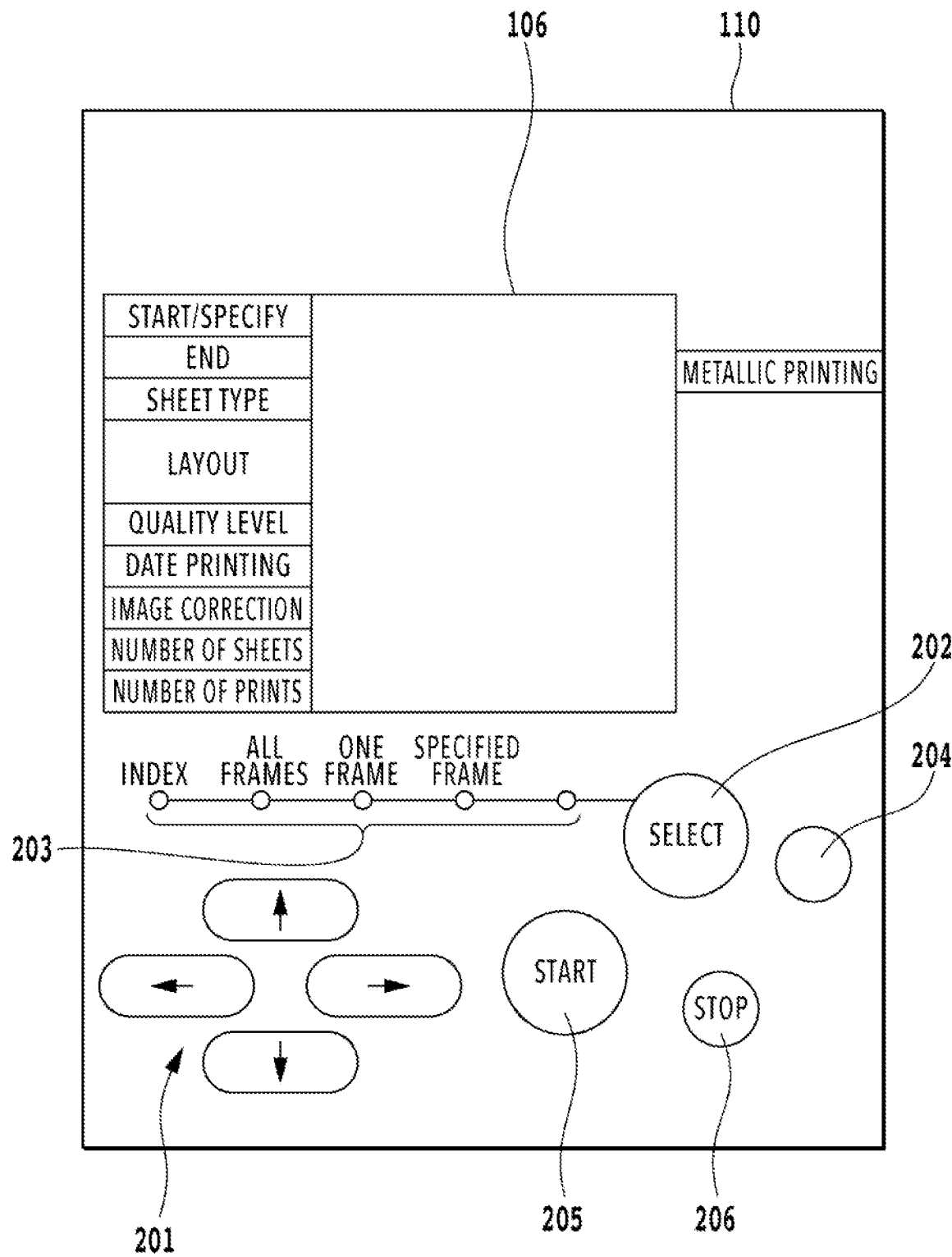
FIG. 2 is a diagram showing the outline of an operating panel.

FIG. 2 is a diagram showing the outline of the operating panel 110. The liquid crystal display unit 106 displays on right and left sides the set contents of individual items printed. The user may use a cursor key 201 to specify an item, and set the contents of the specified item. The following is a brief description of one example of individual items and set contents.

"Start/Specify" sets a first frame to be printed among a plurality of frames (images).

"End" sets a last frame to be printed among a plurality of frames (images).

"Sheet Type" sets the type of a print medium for use in printing.

"Layout" sets the number of frames (images) to be laid out on a single print medium.

"Quality Level" sets the quality level of an output image.

"Date Printing" sets whether to print a date of shooting.

"Image Correction" sets whether to print image data after correction.

"Number of Sheets" sets the number of print media for use in printing.

"Number of Prints" sets the number of prints output.

"Metallic Printing" sets whether to give a metallic gloss to an image to be printed.

LEDs 203 and a mode key 202 are disposed on a lower portion of the liquid crystal display unit 106. Every time the mode key 202 is pressed, the LEDs 203 respectively indicating index printing, all frames printing, one frame printing, and specified frame printing are turned on one after another to enable switching of the printing mode among the mentioned printings.

A maintenance key 204 is a key for specifying maintenance processing of the printing apparatus 1, such as cleaning of the print head. A start key 205 is a key for starting printing or maintenance based on the currently set contents. A stop key 206 is a key for stopping active print operation or active maintenance operation.

(Outline of Electronic Specifications of Printer Control Unit)

Figure 3:
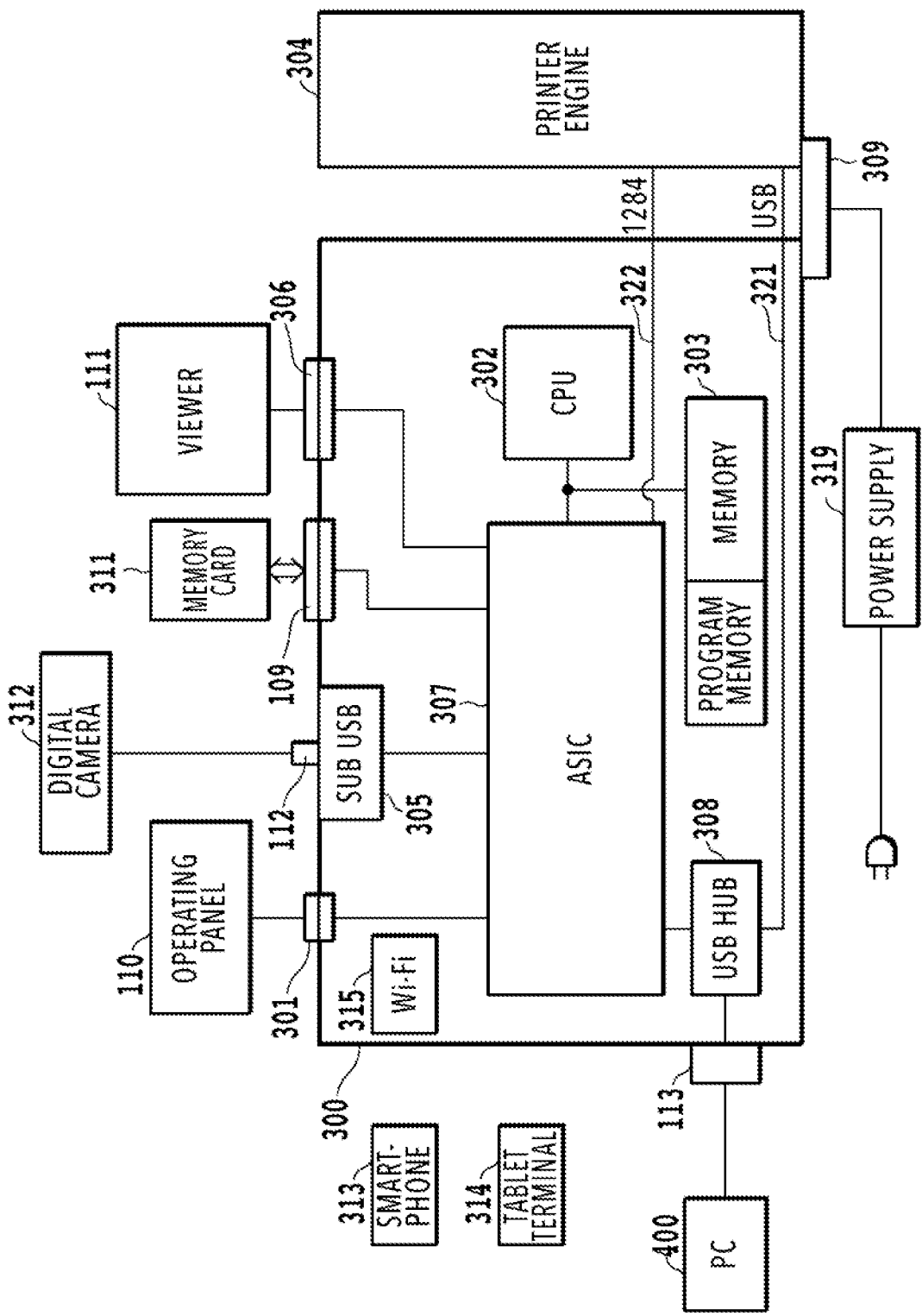
FIG. 3 is a block diagram for describing the configuration of a control unit in the printing apparatus.

FIG. 3 is a block diagram for describing the configuration of a control unit in the printing apparatus 1. A control unit 300 is provided with a CPU 302, which performs the general control of the apparatus, and an image processing ASIC (dedicated custom LSI) 307 that performs general image processing to be described later at a high speed under control of the CPU 302. A memory 303 includes a program memory for storing a program which is executed by the CPU 302, and a work memory serving as a work area at the time of execution.

A USB HUB 308 supplies image data received via the USB connector 113 from the PC 400 to the ASIC 307. A SUB HUB 305 supplies image data received via the USB terminal 112 from a digital camera 312 to the ASIC 307. The image data stored in a memory card 311 is supplied to the ASIC 307 via the adapter inserted into the card slot 109. The Wi-Fi (registered trademark) device 315 supplies image data received from a smartphone 313 or a tablet terminal 314 wirelessly connected to the Wi-Fi (registered trademark) device 315 to the ASIC 307.

The ASIC 307 performs predetermined image processing on image data received from various devices in the aforementioned manner, and sends the image data to a printer engine 304. At this time, signal exchange between the control unit 300 and the printer engine 304 is carried out via a USB 321 or an IEEE1284 bus 3022.

The printing apparatus 1 of the present embodiment is an inkjet printing apparatus that forms an image through printing (1) or non-printing (0) of dots using color inks of cyan, magenta and yellow and metallic ink for giving metallic gloss to the image. Accordingly, the ASIC 307 generates print data showing printing (1) or non-printing (0) of dots corresponding to the individual inks based on the received image data.

It is to be noted however that it is not essential for the ASIC 307 in the apparatus to perform the aforementioned image processing. In a case where the PC 400, the smartphone 313 or the tablet terminal 314 can provide print data which can be processed by the printer engine 304, the ASIC 307 does not need to perform special processing on the received image data, but has only to output the image data directly to the printer engine 304.

The operating panel 110 and the viewer 111 are connected to the ASIC 307 via respective connectors 301 and 306. Power supplied from a commercial AC power supply and transformed into a DC voltage by a power supply 319 is supplied to the control unit 300 and the printer engine 304 via a power supply connector 309.

(Outline of Electronic Specifications of Printer Engine Unit)

Figure 4:
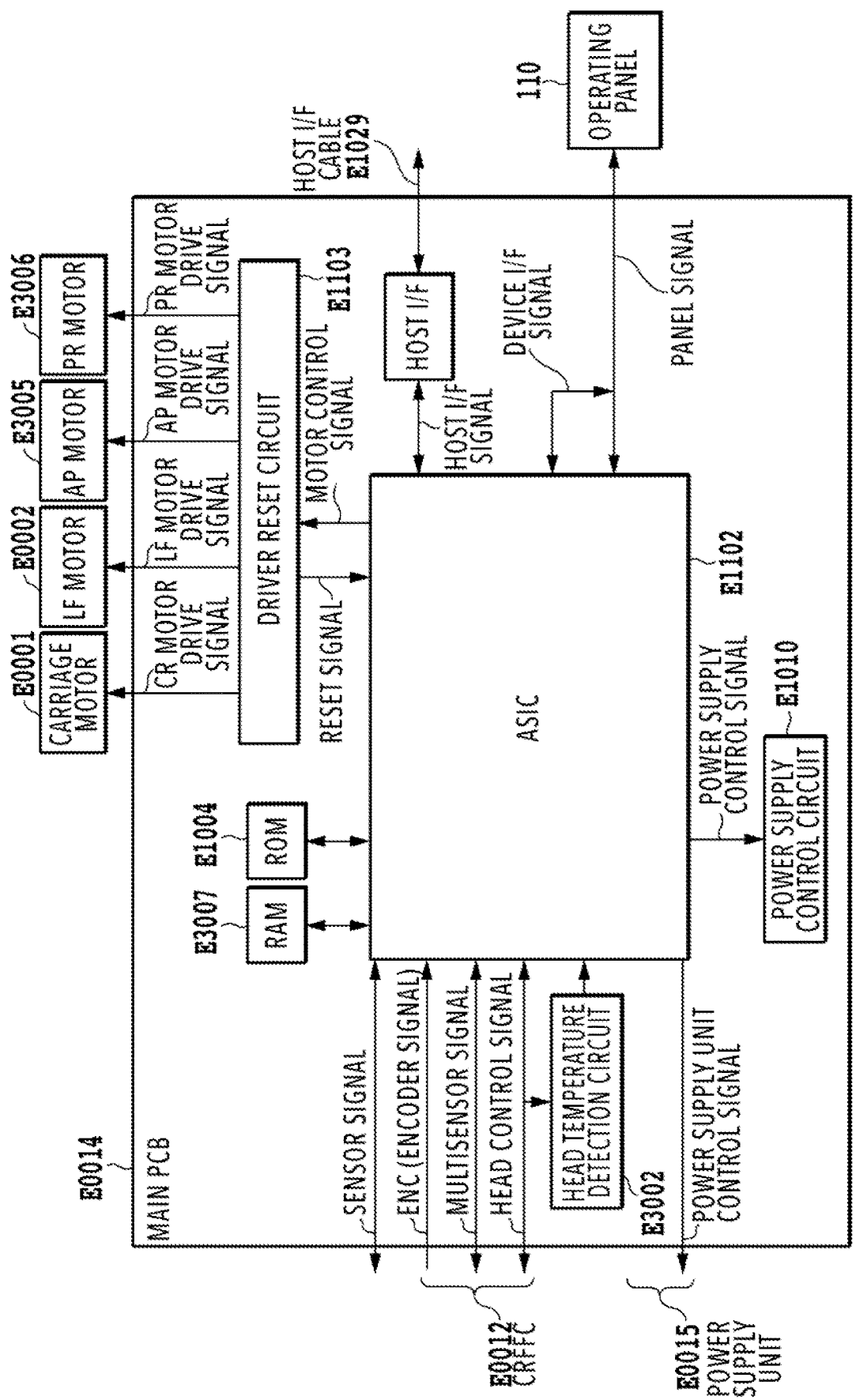
FIG. 4 is a block diagram showing a control configuration in a printer engine.

FIG. 4 is a block diagram showing a control configuration in the printer engine 304. An ASIC E1102 which is a 1-chip semiconductor integrated circuit with a built-in processor is mounted on a main PCB (Printed Circuit Board) E0014. The ASIC E1102 controls the overall apparatus by driving the individual components according to a program stored in a ROM E1004 while using a RAM E3007 as a work area. The ASIC E1102 is connected to individual circuits and sensors by a control bus.

For example, the ASIC E1102 is connected to various sensors such as a PE sensor and ASF sensor, and exchanges sensor signals with those sensors to detect and control the status of the apparatus.

Figure 6:
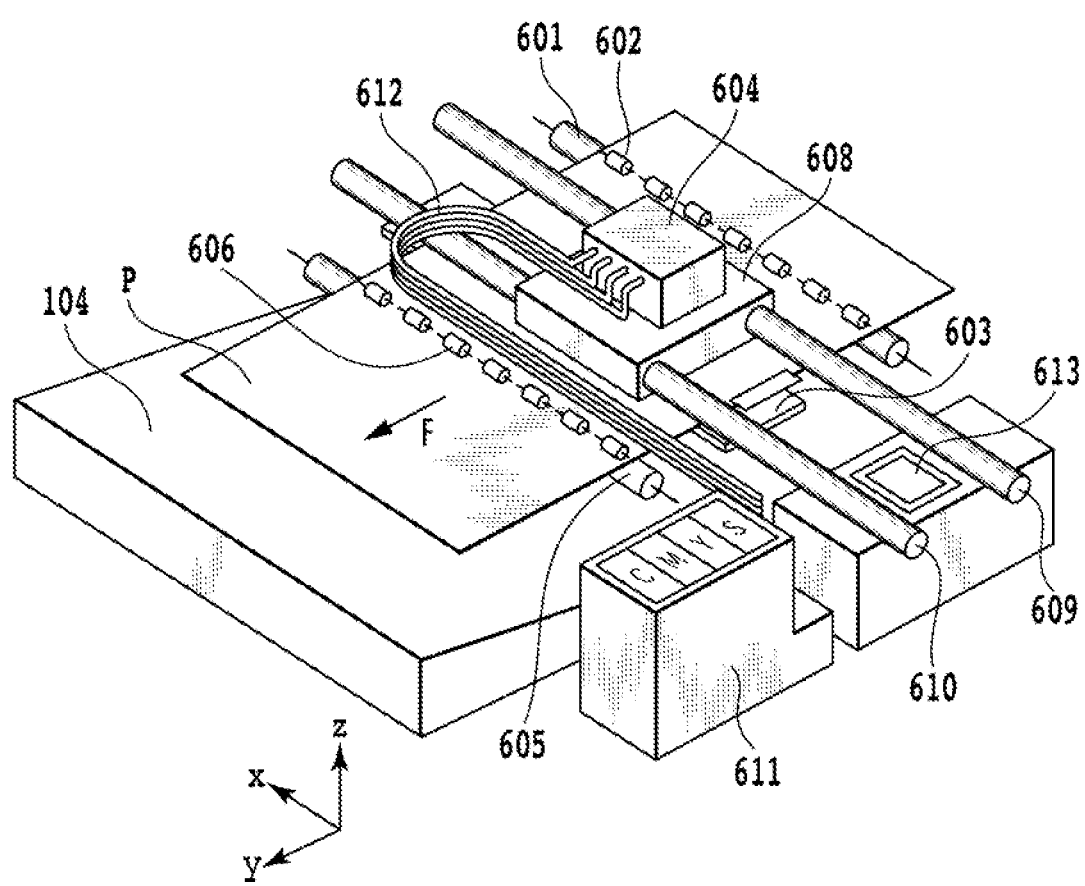
FIG. 6 is a configuration diagram of a printing unit in the printing apparatus.

The ASIC E1102 is connected via CRFFC (Carriage Flexible Flat Cable) E0012 to an encoder sensor, multisensor and a print head 604 (see FIG. 6) which are mounted on a carriage 608 (see FIG. 6). Based on an encoder signal acquired from the encoder sensor, the ASIC E1102 grasps the position of the carriage 608 and drives the print head 604 using a head control signal. A head temperature detection circuit E3002 receives temperature information output from a temperature sensor mounted on the print head 604, and supplies the temperature information to the ASIC E1102 after amplifying the temperature information.

Further, the ASIC E1102 receives a command input through the operating panel 110, and controls blinking of the LEDs disposed on the operating panel 110 and displaying of the liquid crystal display unit 106.

A driver reset circuit E1103 drives a carriage motor E0001, an LF motor E0002, an AP motor E3005, and a PR motor E3006 according to motor control signals received from the ASIC E1102. The driver reset circuit E1103 includes a power supply circuit to supply required power to individual components such as a carriage board (not shown) and the operating panel 110 as well as the main PCB E0014. Moreover, the driver reset circuit E1103 detects a drop in power supply voltage, and generates a reset signal E1015 and performs initialization in such a case.

A power supply control circuit E1010 controls power supply to various sensors and the like according to a power supply control signal from the ASIC E1102. A host I/F E0017 transfers a host I/F signal from the ASIC E1102 to a host I/F cable E1029 externally connected, and transfers signal from the host I/F cable E1029 to the ASIC E1102. The host I/F cable E1029 is connected to the PC 400 via the ASIC 307 and the USB HUB 308 of the control unit 300 shown in FIG. 3.

A power supply unit E0015 is connected to the power supply connector 309 (see FIG. 3) to supply power to the individual components on or outside the main PCB E0014 after voltage conversion as needed. The ASIC E1102 sends a power supply unit control signal to the power supply unit E0015 as needed, and controls supplied power in a case where a low-consumption power mode is set or the like.

(Outline of Image Processing)

Figure 5:
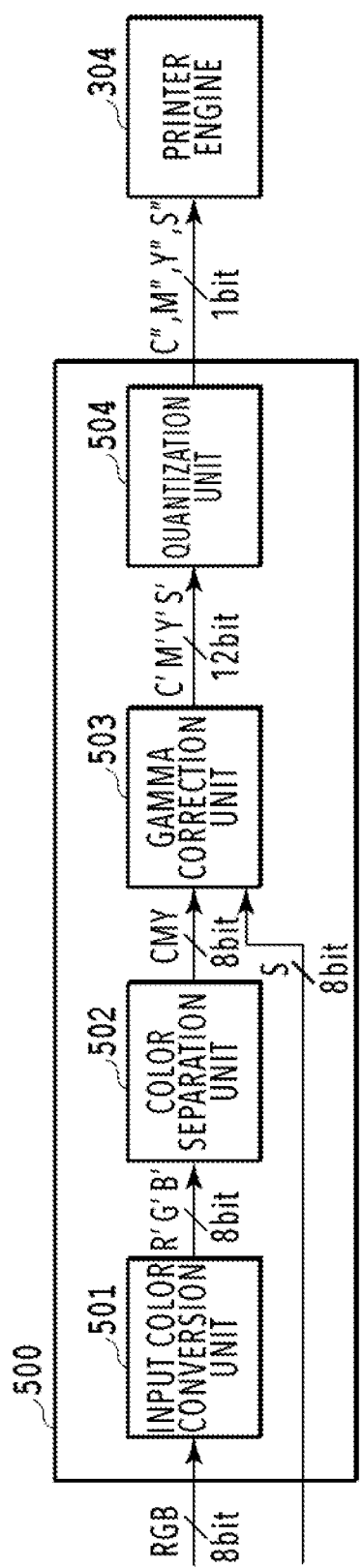
FIG. 5 is a diagram showing the outline of image processing.

FIG. 5 is a diagram showing the outline of image processing that is performed by the ASIC 307 of the control unit 300. A description of the present embodiment will be given of a case where 8-bit data of R (red), G (green) and B (blue) is input as image data from an external device, such as the PC 400, the memory card 311, the digital camera 312, the smartphone 313, or the tablet terminal 314 by way of example.

Eight-bit RGB data is input to an image processing unit 500, and is subjected to predetermined image processing in order by an input color conversion unit 501, a color separation unit 502, a gamma correction unit 503, and a quantization unit 504.

The input color conversion unit 501 converts the 8-bit RGB data to 8-bit R'G'B' data which is in conformity with color space expressable by the printing apparatus 1. Although matrix computation processing and a three-dimensional lookup table (3DLUT) can be used in the color conversion, the 3DLUT is used in the present embodiment.

The 3DLUT according to the present embodiment stores, as RGB grid points, 16-level discrete gradation values such as 0, 17, 34, . . . , 255 among gradation values of 0 to 255 equivalent to what is expressed by an 8-bit signal. One set of an R' value, G' value and B' value corresponds to each grid point, that is, one set of an R value, G value and B value. In other words, (R'G'B') sets corresponding to 16×16× 16=4096 types of (R, G, B) sets are prepared in the 3DLUT according to the present embodiment.

In a case where an input signal (R, G, B) is a set corresponding to a grid point, the input color conversion unit 501 outputs (R'G'B') corresponding to the grid point as an output signal. In a case where an input signal (R, G, B) is a set of signal values which do not correspond to a grid point, the input color conversion unit 501 performs interpolation using signals values of four grid points in the vicinity of the grid point, and outputs calculated (R'G'B') as an output signal.

The color separation unit 502 converts 8-bit R'G'B' data to 8-bit C (cyan), M (magenta), Y (yellow) data respectively corresponding to inks retained by the printing apparatus 1. Like the input color conversion unit 501, the color separation unit 502 can use matrix computation processing and a three-dimensional lookup table (3DLUT) in the conversion.

The gamma correction unit 503 corrects 8-bit data of CMY output from the color separation unit 502 to 12-bit data of C'M'Y', respectively. Further, 8-bit data (S) corresponding to metallic ink in addition to 8-bit data of CMY is also input to the gamma correction unit 503, which in turn converts this signal value S to 12-bit data of S'.

The gamma correction unit 503 performs signal conversion in such a way that an image density expressed on a print media according to C'M'Y' has a linearity to an input signal value CMY. In the present embodiment, the gamma correction unit 503 performs the aforementioned correction using one-dimensional lookup tables respectively prepared for cyan ink, magenta ink, yellow ink and metallic ink.

The quantization unit 504 uses a predetermined quantization method to convert each of 12-bit data C'M'Y'S' output from the gamma correction unit 503 to binary data (1-bit data) indicating printing (1) or non-printing (0). A known dither method or error diffusion method may be used as the quantization method. One-bit data of each of C", M", Y" and S" data generated by the quantization unit 504 is sent to the printer engine 304.

Although the aforementioned sequence of image processing has been described to be performed by the ASIC 307 included in the control unit 300 of the printing apparatus 1 in the above description, the image processing may be partially or entirely performed by the PC 400, the smartphone 313, or the tablet terminal 314 which is the source of image data. Whether a signal value S for metallic ink is sent to the gamma correction unit 503 is determined by whether a user instructs metallic printing. The user may set metallic printing through the operating panel 110 of the printing apparatus 1, but may also set metallic printing on the PC 400, the smartphone 313, or the tablet terminal 314. Metallic printing will be described in detail later.

(Configuration of Printing Unit)

FIG. 6 is a configuration diagram of a printing unit in the printing apparatus 1. The carriage 608 is driven by the carriage motor E0001 to reciprocate along guide shafts 609 and 610 in an x-direction in FIG. 6. The print head 604 mounted on the carriage 608 has four arrays of ejection openings disposed therein to respectively eject color inks of cyan, magenta and yellow and metallic ink During the movement of the carriage 608, the carriage 608 ejects inks toward a print medium P through the individual ejection openings according to binary print data. That area of a print medium P where print scanning is performed by the print head 604 is supported from the back side by a platen 603.

A print medium P in front of and behind the printing area is held by a roller pair of a conveying roller 601 and pinch rollers 602 and a roller pair of a discharging roller 605 and spur rollers 606. Every time each print scanning is performed by the print head 604, the conveying roller 601 and the discharging roller 605 are driven by the LF motor E0002 to rotate and convey a print medium in a y-direction (conveyance direction crossing a print scanning direction) by a predetermined distance corresponding to one band. As the aforementioned print scanning and conveyance operation are alternately repeated, images are sequentially formed on a print medium. A print medium P whose printing is completed is discharged on the discharging tray 104 by the conveying roller 601 and the discharging roller 605.

An ink tank 611 that store color inks of three colors and metallic ink is disposed outside a widthwise area of a print medium P in the x-direction, so that inks to be ejected by the print head 604 are supplied from the ink tank 611 through ink tubes 612.

A maintenance unit 613 for protecting the print head 604 in standby state or for permitting maintenance processing on the print head 604 is disposed at an end portion in the scanning area of the carriage 608.

Figure 7A:
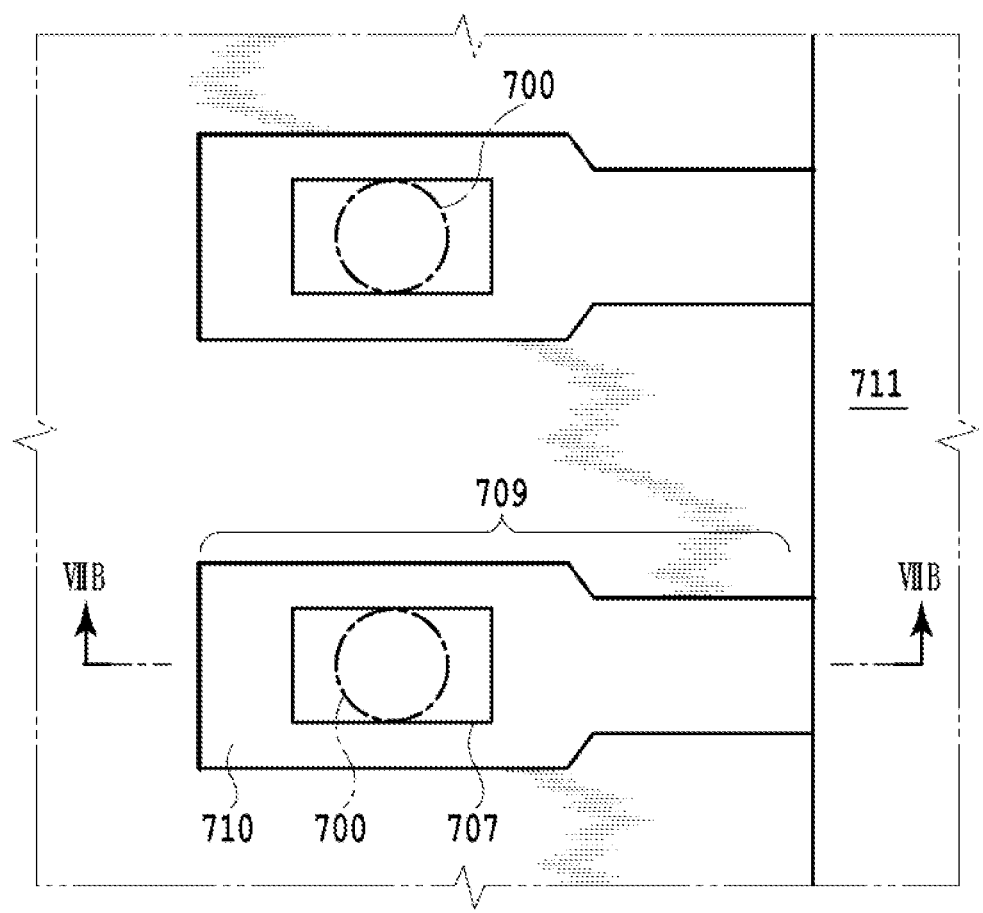
FIGS. 7A and 7B are diagrams for describing the structure of printing elements.
Figure 7B:
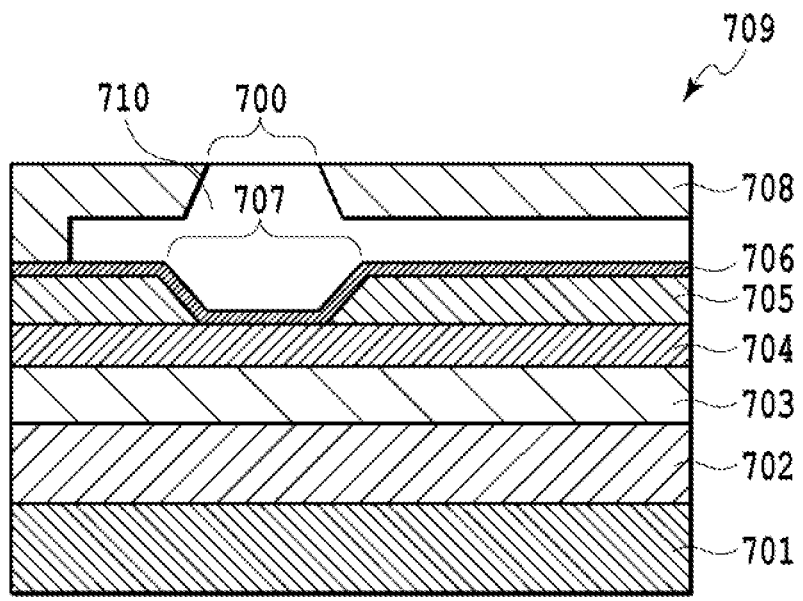

FIGS. 7A and 7B are diagrams for describing the structure of printing elements in the print head 604. FIG. 7A is a diagram viewing two of printing elements arrayed on the print head 604 from the ejection opening surface side. Printing elements 709 each include a pressure chamber 710, a heating part 707, and an ejection opening 700, and ink is supplied to each pressure chamber 710 from a common liquid chamber 711 by capillary force. In a case where a voltage pulse is applied to the heating part 707 according to print data, film boiling occurs in ink which contacts the heating part 707, so that growing energy of bubbles produced causes the ink to be ejected as droplets through the ejection opening 700.

FIG. 7B is a cross-sectional view of the printing element 709. The printing element 709 (printing element substrate) is formed by a plurality of layers. Specifically, the printing element 709 includes a heat accumulating layer 702, an interlayer layer 703, a heating resistance element layer 704, a metal wiring layer 705, a protective layer 706, and a flow path forming member 708 stacked in the named order on a silicon substrate 701. The protective layer 706 serves to protect the printing element against impact of cavitation caused by generation and contraction of bubbles in film boiling or against ink-based chemical functioning.

In the print head 604 according to the present embodiment which performs ejection operation using heat energy in the above manner, in a case where the frequency of ejection operation is high, excessive increase in temperature occurs, which may not guarantee continuation of proper ejection operation. According to the present embodiment, therefore, a temperature sensor is provided in the print head so that print operation is paused in a case where an output value of the temperature sensor has exceeded a threshold value, and print operation is resumed after the output value of the temperature sensor falls below the threshold value.

Next, metallic ink and color inks which are available in the present embodiment will be described. "Metallic ink" used herein indicates ink containing metal particles. "Color ink" used herein indicates ink of cyan, magenta or yellow containing a dye as a color material. Moreover, "metallic printing" used herein indicates printing that applies the metallic ink and at least one of the color inks onto a print medium to output an image which has metallic gloss and includes an arbitrary color tone in regular reflected light.

(Metallic Ink)

Metallic ink of the present embodiment contains metal particles, a dispersant, a surfactant, and an aqueous medium. The content of the metal particles is preferably 0.1% by mass to 30.0% by mass, and more preferably 1.0% by mass to 15.0% by mass.

(Metal Particles)

The metal particles used for metallic ink are not particularly limited, and examples thereof may include particles of gold, silver, copper, platinum, aluminum, titanium, chromium, iron, nickel, zinc, zirconium, and tin. The metal particles may be alloys of the above-mentioned metals, and may be used in combination. However, from the viewpoint of particle storage stability and glossiness of images, it is preferable to use particles of gold, silver, and copper as the metal particles, and silver particles are particularly preferable. Silver particles can impart high glossiness without affecting the color of an image, and can therefore express a wide range of metallic colors if combined with colored inks. The following will specifically describe this embodiment with reference to a case where silver particles are used.

The purity of silver in silver particles may be 50% by mass or more. For example, other metals, oxygen, sulfur, carbon and the like may be contained as additives, or an alloy may be used. A production method for silver particles is not particularly limited, but in consideration of particle size control and dispersion stability of silver particles, the silver particles may be produced preferably from a water-soluble silver salt by various kinds of synthesis methods utilizing a reduction reaction.

The mean particle size of silver particles is preferably 1 nm or greater and 200 nm or less, and more preferably 10 nm or greater and 100 nm or less, from the viewpoint of storage stability of ink and the glossiness of an image formed by the silver particles. FPAR-1000 (manufactured by Otsuka Electronics Co., Ltd., Cumulant method analysis), Nanotrac UPA 150 EX (manufactured by Nikkiso Co., Ltd., an integrated value of 50% of the mean volume particle size is used) or the like, which utilizes scattering of a laser beam, can be adopted as the method of measuring the mean particle size.

In a case of using silver particles as metal particles, it is preferable that the content of silver particles be 2.0% by mass or more and 15.0% by mass or less. If the content of silver particles is less than 2.0% by mass, the metallic glossiness of an image may be reduced. In a case where the content of silver particles exceeds 15.0% by mass, ink overflow is likely to occur, which may result in deviation of the printing position.

(Dispersant)

The dispersion method for metal particles in metallic ink is not particularly limited. For example, a method of dispersing with a surfactant or a method of dispersing with a dispersing resin can be adopted. Of course, a surfactant and a dispersing resin may be combined to form a dispersant.

In a case where a surfactant is used as a dispersant, the surfactant may be anionic, nonionic, cationic or amphoteric. Examples of the anionic surfactant include fatty acid salts, alkyl sulfates, alkylaryl sulfonates, alkyldiaryl ether disulfonates, dialkyl sulfosuccinates, alkyl phosphates, and naphthalene sulfonic acid formalin condensates. Examples of the anionic surfactant may also include polyoxyethylene alkyl phosphate ester salts, and glycerol borate fatty acid esters.

Examples of the nonionic surfactant include polyoxyethylene alkyl ethers, a polyoxyethylene oxypropylene block copolymer, sorbitan fatty acid esters, and glycerin fatty acid esters. Examples of the nonionic surfactant may also include polyoxyethylene fatty acid esters, polyoxyethylene alkylamines, fluorine based, and silicon based.

Examples of the cationic surfactant include alkylamine salts, quaternary ammonium salts, alkylpyridinium salts, and alkylimidazolium salts. Examples of the amphoteric surfactant include alkylamine oxides and phosphatidylcholine.

In a case where a surfactant is used as a dispersant, any dispersing resin may be used as long as it is a resin having water solubility or water dispersibility. Among others, those dispersing resins which have a weight average molecular weight of 1,000 or more and 100,000 or less, and further 3,000 or more and 50,000 or less are preferable.

The following are available, for example, as dispersing resins: polymers each containing, as a monomer, styrene, vinyl naphthalene, aliphatic alcohol ester of α,β-ethylenically unsaturated carboxylic acid, acrylic acid, maleic acid, itaconic acid, fumaric acid, vinyl acetate, vinyl pyrrolidone, acrylamide, or a derivative thereof. In addition, it is preferable that one or more of monomers constituting a polymer be a hydrophilic monomer, and a block copolymer, a random copolymer, a graft copolymer, or a salt thereof may be used. Alternatively, natural resins such as rosin, shellac and starch are also available.

In a case where a dispersing resin is used, it is preferable that the content (% by mass) of the dispersing resin in metallic ink be 0.02 to 3.00 times the content (% by mass) of the silver particles in terms of the mass ratio. In a case where the mass ratio is less than 0.02 times, dispersion of silver particles becomes unstable, which may cause the silver particles to easily adhere to the heat generating parts 707, so that foaming and discharging operation may not be performed properly. In a case where the mass ratio is more than 3.00 times, the dispersant may inhibit fusion of silver particles in a print medium, so that a suitable metallic glossiness may not be obtained in an image.

(Surfactant)

In metallic ink containing silver particles, it is preferable to include a surfactant in the ink in order to stabilize the ejection state. The surfactant available may be anionic, nonionic, cationic or amphoteric as in the case of using as the above-mentioned dispersant. However, in order to stabilize the ejection state, the nonionic type is preferable, and particularly, polyoxyethylene alkyl ether and ethylene oxide adduct of acetylene glycol are preferable. The HLB value (Hydrophile-Lipophile Balance) of these nonionic surfactants is 10 or more. The content of the surfactant used in combination in this way is preferably 0.1% by mass or more and 5.0% by mass or less of metallic ink, more preferably 4.0% by mass or less, and even more preferably 3.0% by mass or less.

(Aqueous Medium)

Examples of the aqueous medium used for the metallic ink include a medium containing water and a water-soluble organic solvent. The content (% by mass) of the water-soluble organic solvent in the metallic ink is preferably 10% by mass or more and 50% by mass or less, and more preferably 20% by mass or more and 50% by mass or less. On the other hand, the content (% by mass) of water in the metallic ink is preferably 50% by mass or more and 88% by mass or less.

The following may be used as the water-soluble organic solvent: alkyl alcohols such as methanol, ethanol, propanol, propanediol, butanol, butanediol, pentanol, pentanediol, hexanol, and hexanediol; amides such as dimethylformamide, dimethylacetamide and the like; ketones such as acetone and diacetone alcohol or keto alcohols; ethers such as tetrahydrofuran and dioxane; polyalkylene glycols such as polyethylene glycol and polypropylene glycol having an average molecular weight of 200, 300, 400, 600 and 1,000; alkylene glycols having an alkylene group having 2 to 6 carbon atoms such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; and lower alkyl ethers of polyhydric alcohols such as ethylene glycol monomethyl (or ethyl) ether, diethylene glycol methyl (or ethyl) ether and triethylene glycol monomethyl (or ethyl) ether.

For water, it is preferable to use deionized water (ion-exchanged water).

In addition to the above-mentioned materials, metallic ink may contain various additives such as pH adjusters, rust inhibitors, preservatives, mildew proofing agent, antioxidants, reduction inhibitors, added resins, and evaporation accelerators, as needed.

(Color Ink)

Each color ink of the present embodiment develops a favorable metallic color as it is applied in an overlapped manner to the area to which the metallic ink is applied. Specifically, the chromaticity of the metallic color is determined by the combination of light reflected at the underlying metallic ink layer and light reflected at the overlying color ink layer. As a result, color ink demands transparency as well as chromaticity, and in the present embodiment, a dye-containing ink excellent in chromaticity and transparency is used.

For an aqueous medium and components other than a dye contained in color ink, the same aqueous medium and components as used in the aforementioned metallic ink can also be used. Thus, a description will be given only of dyes below.

(Dye)

It is required that the dye used in the present embodiment should be coagulated by contact with metallic ink applied earlier to a print medium so as to remain on the surface of the layer, and should have such transparency that the glossiness of the metallic ink can be seen from the surface as well.

An indicator of a coagulation property of a dye can be expressed using a small-angle X-ray scattering technique. The following will exemplify two methods using the small-angle X-ray scattering technique for grasping the coagulation property of the dye.

In the first method, first, a distance d between particles is determined from a value of $2\theta$ obtained from a peak top of a scattering angle profile through the following formula 1 based on the Bragg equation.

$$2d \sin \theta = n\lambda \qquad \text{(Formula 1)}$$

In the formula, $\lambda$ indicates the wavelength of X-rays, d indicates the distance between particles, and $\theta$ indicates the scattering angle. The value d calculated using formula 1 can be regarded as the center-to-center distance of the particles arrayed at constant intervals, and serves as an indicator indicating the size of the molecular assembly. It is considered that as the value d gets larger, the size of a molecular assembly formed by the dye molecules, that is, the coagulation property becomes larger.

In the second method, the peak intensity of the scattering angle profile is determined. The peak shape of the scattering angle profile shows the distribution of the dispersion distance of the molecular assembly. As described above, considering that this dispersion distance is an indicator of the size of the molecular assembly, such a scattering angle profile can be regarded as indicating the distribution of the size of the molecular assembly in the solution. Assuming that the peak intensity of the scattering angle profile is the size of a molecular assembly in the solution, it is considered that as the frequency of the molecular assembly becomes higher, that is, as the peak intensity becomes higher, the coagulation property becomes higher.

In addition, in a case of acquiring a peak value or 2θ through small-angle X-ray scattering, it is necessary to make the molecular density in the solution uniform. For example, measurement of small-angle X-ray scattering is performed on a 5% by mass aqueous solution of a dye at a constant dye concentration. Since the peak intensity varies depending on the apparatus, measurement conditions, etc., a dye serving as a reference may be set as an index of the peak intensity. For example, C. I. Direct Yellow 132 is set as a reference. C. I. Direct Yellow 132 has insufficient association in dye-containing inks. It can be determined that in a case of a sufficient peak intensity, as compared with C. I. Direct Yellow 132, the association in the dye-containing ink is high and the coagulation property is high.

In the present embodiment, cyan ink, magenta ink, and yellow ink used in ink cartridge BC-341XL color (manufactured by Canon Inc.) are used as the color inks. In this case, the color inks in the descending order of higher coagulation property of the dye are the cyan ink, the yellow ink and the magenta ink Next, physical properties of the metallic ink (ink containing silver particles) and the color ink used in the present embodiment will be described.
(Physical Properties of Inks)

The viscosities at 25° C. of the metallic ink (ink containing silver particles) and the color inks used in the present embodiment are preferably 1.0 mPa·s or more and 5.0 mPa·s or less, and more preferably 3.0 mPa·s or less. In a case where the viscosity exceeds 5.0 mPa·s, ink supply to the ejection openings becomes insufficient at the time of continuous discharging, so that stable ejection operation may not be maintained.

In addition, It is preferable that the static surface tension of the metallic ink (ink containing silver particles) and the color ink used in the present embodiment be 10 mN/m or more and 60 mN/m or less, further 20 mN/m or more and 60 mN/m or less, and particularly 30 mN/m or more and 40 mN/m or less. Keeping the surface tension of the ink within the above-mentioned range makes it possible to effectively suppress the discharge deflection (displacement of the landing point of the ink) or the like due to the wetting in the vicinity of the ejection openings. The surface tension of the ink can be adjusted by the content of the surfactant or the like. Further, it is preferable that the metallic ink (ink containing silver particles) and the color ink used in the present embodiment be adjusted to a desired pH so as to obtain good ejection characteristics.

(Print Medium)

Next, a print medium usable in the present embodiment will be described. A print medium usable in the present embodiment has a substrate and at least one ink receiving layer.

Examples of the substrate include a substrate composed of only base paper, and a substrate having base paper and a resin layer, that is, a substrate having base paper coated with a resin. In the present embodiment, it is preferable to use a substrate having base paper and a resin layer. In this case, the resin layer may be provided only on one side of the base paper, but more preferably is provided on both sides.

The ink receiving layer may be a single layer or a multilayer of two or more layers. In addition, the ink receiving layer may be provided on only one side of the above-mentioned substrate, or may be provided on both sides. In the present embodiment, however, the ink receiving layer is required to contain a dye fixing agent.

The following will describe in order the materials that can be contained in the substrate, the resin layer, and the ink receiving layer, and the dye fixing agent.
(Base Paper)

The base paper is made mainly of wood pulp added with, as needed, synthetic pulp of polypropylene or the like, or synthetic fibers of nylon, polyester or the like. Examples of wood pulp include Laubholz bleached kraft pulp (LBKP), Laubholz bleached sulfite pulp (LBSP), Nadelholz bleached kraft pulp (NBKP), Nadelholz bleached sulfite pulp (NBSP), and Laubholz dissolved pulp (LDP). The examples of wood pulp also include Nadelholz dissolved pulp (NDP), Laubholz unbleached kraft pulp (LUKP), and Nadelholz unbleached kraft pulp (NUKP). These pulps may be used alone or in combination of two or more. Among wood pulps, it is preferable to use LBKP, NBSP, LBSP, NDP, and LDP, which contain a lot of short fiber components. As the pulp, chemical pulp (sulfate pulp or sulfite pulp) with few impurities is preferable. In addition, a sizing agent, a white pigment, a paper strengthening agent, a fluorescent whitening agent, a water retention agent, a dispersant, a softening agent or the like may be added as appropriate in the paper substrate.
(Resin Layer)

The resin layer may be provided to cover a part of the surface of the base paper, but the coverage of the resin layer (area of the surface of the base paper covered with the resin layer/total area of the surface of the base paper) is preferably 70% or more. The coverage of the resin layer is more preferably 90% or more, and it is especially preferable that the coverage of the resin layer be 100%, that is, the entire surface of the base paper is coated with the resin layer.

As a resin used for a resin layer, a thermoplastic resin is preferable. Examples of the thermoplastic resin include acrylic resins, acrylic silicone resins, polyolefin resins, and styrene-butadiene copolymers. Among these resins, the polyolefin resin is preferably used. In the present invention, the polyolefin resin refers to a polymer using an olefin as a monomer. Specifically, examples of such a polymer include homopolymers and copolymers of ethylene, propylene, and isobutylene. The polyolefin resins can be used alone or in combination of two or more as needed. Among these polyolefin resins, it is preferable to use polyethylene. As polyethylene, low-density polyethylene (LDPE) or high-density polyethylene (HDPE) is preferably used.

The resin layer may contain a white pigment, a fluorescent whitening agent, ultramarine blue and the like in order to adjust the opacity, whiteness and hue. Among these components, it is preferable to contain a white pigment which can improve the opacity. Examples of the white pigment include rutile-type or anatase-type titanium oxide. The content of the white pigment in the resin layer to the content of the resin is preferably 25% by mass or less. In a case where the content of the white pigment is more than 25% by mass, the dispersion stability of the white pigment may not be sufficiently obtained.

(Inorganic Particles)

In the present embodiment, the ink receiving layer preferably contains inorganic particles. The average primary particle size of the inorganic particles is preferably 50 nm or less. Furthermore, the average primary particle size of the inorganic particles is more preferably 1 nm or more and 30 nm or less, and is especially preferable to be 3 nm or more and 10 nm or less. The average primary particle size of the inorganic particles is the average diameter of a circle having an area equal to the projected area of the primary particles of the inorganic particles as observed with an electron microscope. At this time, it is preferable to perform measurement at at least 100 points.

The inorganic particles are preferably used in a coating liquid for the ink receiving layer in a state where the inorganic particles are dispersed by the dispersant. The average secondary particle size of the inorganic particles in the dispersed state is preferably 0.1 nm or more and 500 nm or less, more preferably 1.0 nm or more and 300 nm or less, and particularly preferably 10 nm or more and 250 nm or less. The average secondary particle size of the inorganic particles in the dispersed state can be measured by a dynamic light scattering method.

The content (% by mass) of the inorganic particles in the ink receiving layer is preferably 50% by mass or more and 98% by mass or less, and more preferably 70% by mass or more and 96% by mass or less.

The coating amount (g/m$^2$) of the inorganic particles to be applied at the time of forming the ink receiving layer is preferably 8 g/m$^2$ or more and 45 g/m$^2$ or less. The above range is likely to cause the ink receiving layer to have a preferable film thickness.

As the inorganic particles, for example, alumina hydrate, alumina, silica, colloidal silica, titanium dioxide, zeolite, kaolin, talc, hydrotalcite, zinc oxide, zinc hydroxide, and aluminum silicate can be used. Calcium silicate, magnesium silicate, zirconium oxide, zirconium hydroxide and the like are also available. These inorganic particles may be used alone or in combination of two or more as needed. Among the above-mentioned inorganic particles, it is preferable to use alumina hydrate, alumina or silica which can form a porous structure having high ink absorbency.

For alumina hydrate used in the ink receiving layer, what is expressed by a general formula (X): $Al_2O_{3-n}(OH)_{2n} \cdot mH_2O$ (where n is 0, 1, 2, or 3 and m is 0 or more and 10 or less, preferably 0 or more and 5 or less; however, m and n do not become 0 at the same time) can be used favorably. Note that m does not have to be an integer because $mH_2O$ often represents a removable aqueous phase that does not contribute to the formation of a crystal lattice. Further, m may be 0 in a case where alumina hydrate is heated.

Alumina hydrate can be produced by known methods. Specifically, the known methods include a method of hydrolyzing aluminum alkoxide, a method of hydrolyzing sodium aluminate, and a method of adding an aqueous solution of aluminum sulfate and aluminum chloride to an aqueous solution of sodium aluminate for neutralization.

As the crystal structure of alumina hydrate, an amorphous type, a gibbsite type and a boehmite type which are classified according to the heat-treatment temperature are known. The crystal structure of alumina hydrate can be analyzed by X-ray diffraction. Among these alumina hydrates, boehmite type alumina hydrate or amorphous alumina hydrate is preferable in the present embodiment. Specific examples of such alumina hydrate include alumina hydrates described in Japanese Patent Laid-Open No. H07-232473, Japanese Patent Laid-Open No. H08-132731, Japanese Patent Laid-Open No. H09-66664, and Japanese Patent Laid-Open No. H09-76628. Commercial products of such alumina hydrate can include Disperal HP14 and HP18 (both produced by Sasol). These alumina hydrates can be used alone or in combination of two or more.

The specific surface area of the alumina hydrate determined by the BET method is preferably 100 m$^2$/g or more and 200 m$^2$/g or less, and more preferably 125 m$^2$/g or more and 175 m$^2$/g or less. The BET method is a method of adsorbing molecules or ions with a known size on the surface of a sample and measuring the specific surface area of the sample from the amount of adsorption. Nitrogen gas is used as a gas to be adsorbed to the sample.

As the alumina used for the ink receiving layer, gas phase alumina is preferable. Examples of gas phase alumina include γ-alumina, α-alumina, δ-alumina, θ-alumina, and χ-alumina. Among these types of alumina, γ-alumina is preferably used from the viewpoint of the optical density of an image and the ink absorbency. Specific examples of gas phase alumina include AEROXIDE; Alu C, Alu130, and Alu65 (all manufactured by EVONIK).

In the present invention, the specific surface area of gas phase alumina determined by the BET method is preferably 50 m$^2$/g or more, and more preferably 80 m$^2$/g or more. Moreover, the specific surface area of gas phase alumina is preferably 150 m$^2$/g or less and more preferably 120 m$^2$/g or less.

The average primary particle size of gas-phase method alumina is preferably 5 nm or more, and more preferably 11 nm or more. Gas-phase alumina having an average primary particle size of 5 nm or more easily maintains the ink absorbency. Moreover, the average primary particle size of gas-phase alumina is preferably 30 nm or less, and more preferably 15 nm or less. With the average primary particle size of 30 nm or less, silver ink is fixed to the surface of the ink receiving layer, which makes it easy to obtain high metallic gloss.

The alumina hydrate and alumina used in the present invention are preferably mixed as aqueous dispersion in the coating liquid for the ink receiving layer, and it is preferable to use an acid as the dispersant. As an acid, it is preferable to use a sulfonic acid expressed by a general formula (Y): R—SO$_3$H (where R represents a hydrogen atom, an alkyl group having a carbon number of 1 or more and 4 or less, or an alkenyl group having a carbon number of 1 or more and 4 or less; R may be substituted with an oxo group, a halogen atom, an alkoxy group, and an acyl group) for the effect of suppressing image bleeding is obtained. The content of the acid to the total content of alumina hydrate and alumina is preferably 1.0% by mass or more and 2.0% by mass or less, and more preferably 1.3% by mass or more and 1.6% by mass or less.

Silicas used in the ink receiving layer are roughly classified into a wet method and a dry method (gas phase method) depending on its production method. As the wet method, there is known a method of producing active silica by acid decomposition of a silicate, and subjecting this active silica to appropriate polymerization and coagulation settling to obtain hydrous silica. As the dry method (gas phase method), there is known a method of obtaining anhydrous silica by a method involving high temperature gas-phase hydrolysis of silicon halide (flame hydrolysis method), or a method of performing heating, and reduction and vaporization of silica sand and coke by arc in an electric furnace, and then oxidizing the resultant product with air (arc method). In the present embodiment, it is preferable to use silica obtained by the dry method (gas phase method), which will be hereinafter also referred to as "gas-phase silica." This is because gas-phase silica has a particularly large specific surface area, which leads to particularly high ink absorbency, and has a low refractive index, which can provide the ink receiving layer with transparency, so that good color development can be obtained. Specifically, examples of gas phase silica include Aerosil (manufactured by Nippon Aerosil), and Leorosil QS type (manufactured by Tokuyama).

The specific surface area of gas-phase silica determined by the BET method is preferably 50 $m^2/g$ or more and 400 $m^2/g$ or less, and more preferably 200 $m^2/g$ or more and 350 $m^2/g$ or less.

In the present invention, gas-phase silica is preferably used in the coating liquid for the ink receiving layer in a state where gas-phase silica is dispersed by a dispersant. The particle size of gas-phase silica in the dispersed state is more preferably 50 nm or more and 300 nm or less. The particle size of gas-phase silica in the dispersed state can be measured by the dynamic light scattering method.

Alumina hydrate, alumina and silica may be used as a mixture. Specific examples of a method of providing the mixture include a method of mixing at least two selected from a group consisting of alumina hydrate, alumina and silica in a powder state and dispersing the mixture to provide a dispersion. In the present invention, it is preferable to use both alumina hydrate and gas phase alumina as inorganic particles.

(Binder)

The ink receiving layer preferably contains a binder. The binder herein refers to a material capable of binding inorganic particles to form a coating.

From the viewpoint of ink absorbency, the content of the binder in the ink receiving layer to the content of the inorganic particles is preferably 50% by mass or less, and more preferably 30% by mass or less. In addition, from the viewpoint of the binding property of the ink receiving layer, the ratio is preferably 5.0% by mass or more, and more preferably 8.0% by mass or more.

Examples of the binder include starch derivatives such as oxidized starch, etherified starch and phosphated starch; cellulose derivatives such as carboxymethyl cellulose and hydroxyethyl cellulose; and casein, gelatin, soybean protein, and polyvinyl alcohol. The examples of the binder also include derivatives of the aforementioned components; conjugated polymer latexes such as polyvinyl pyrrolidone, maleic anhydride resin, a styrene-butadiene copolymer, and a methyl methacrylate-butadiene copolymer; acrylic polymer latexes such as polymers of acrylic esters and methacrylic esters; vinyl polymer latex such as an ethylene-vinyl acetate copolymer; functional group modified polymer latexes with a monomer containing a functional group, such as a carboxyl group, of the above-mentioned polymers; what is obtained by catinizing the above-mentioned polymer using a cationic group; what is obtained by catinizing the surface of the above-mentioned polymer using a cationic surfactant; what is obtained by polymerizing the monomers constituting the above-mentioned polymers under cationic polyvinyl alcohol and distributing polyvinyl alcohol on the surface of the polymer; what is obtained by polymerizing the monomers constituting the above-mentioned polymer in the suspension dispersion liquid of cationic colloid particles, and distributing the cationic colloid particles on the surface of the polymer; queous binders such as thermosetting synthetic resins such as melamine resin and urea resin; polymers and copolymers of acrylic acid esters and methacrylic acid esters such as polymethyl methacrylate; and synthetic resins such as polyurethane resins, unsaturated polyester resins, vinyl chloride-vinyl acetate copolymers, polyvinyl butyral and alkyd resins. These binders may be used alone or in combination of two or more as needed.

Among the above-mentioned binders, it is preferable to use polyvinyl alcohol and polyvinyl alcohol derivatives. Examples of the polyvinyl alcohol derivative include cation-modified polyvinyl alcohol, anion-modified polyvinyl alcohol, silanol-modified polyvinyl alcohol, and polyvinyl acetal. As the cation-modified polyvinyl alcohol, polyvinyl alcohol having a primary to tertiary amino group or a quaternary ammonium group in the main chain or side chain of polyvinyl alcohol as described in, for example, Japanese Patent Laid-Open No. S61-10483 is preferred.

In a case of preparing the coating liquid for the ink receiving layer, it is preferable to use polyvinyl alcohol or a polyvinyl alcohol derivative as an aqueous solution. In that case, the content of a solid component of polyvinyl alcohol, and a polyvinyl alcohol derivative in the aqueous solution is preferably 3% by mass or more and 20% by mass or less.

(Crosslinking Agent)

The ink receiving layer preferably further contains a crosslinking agent. Examples of the crosslinking agent include aldehyde compounds, melamine compounds, isocyanate compounds, zirconium compounds, amide compounds, aluminum compounds, boric acid, and boric acid salt. These crosslinking agents may be used alone or in combination of two or more as needed. In a case of using polyvinyl alcohol or a polyvinyl alcohol derivative as a binder, especially, it is preferable to use a boric acid and boric acid salt among the above-mentioned crosslinking agents.

Examples of the boric acid include orthoboric acid ($H_3BO_3$), metaboric acid, and diboric acid. As the boric acid salt, a water-soluble salt of the above-mentioned boric acid is preferable. Examples of the boric acid salt include alkali metal salts of boric acid such as a sodium salt and potassium salt of boric acid; alkaline earth metal salts of boric acid such as magnesium salt and calcium salt of boric acid; and an ammonium salt of boric acid. Among these boric acid salts, it is preferable to use orthoboric acid from the viewpoint of the temporal stability of the coating liquid and the effect of suppressing the occurrence of cracks.

The amount of the crosslinking agent used can be appropriately adjusted according to the production conditions and the like. The content of the crosslinking agent in the ink receiving layer to the content of the binder is preferably 1.0% by mass or more and 50% by mass or less, and more preferably 5% by mass or more and 40% by mass or less.

Furthermore, in a case where the binder is polyvinyl alcohol and the crosslinking agent is at least one selected from the group consisting of boric acid and boric acid salts, it is preferable that the total content of boric acid and boric acid salts to the content of polyvinyl alcohol in the ink receiving layer be 5% by mass or more and 30% by mass or less.

(Dye Fixing Agent)

In the present embodiment, the dye fixing agent refers to a material capable of coagulating an aqueous dye-containing ink containing a dye. Examples of the dye fixing agent include polymers having primary to quaternary amines or derivatives thereof as monomers, polyaluminum chloride, and a zirconium compound. Representative examples of primary to quaternary amines include primary amines such as methylamine, ethylamine, ethylenediamine, and allylamine. Examples of secondary amines include dimethylamine, diethylamine, diallylamine, dicyandiamide, and dimethylenetriamine, diethylenetriamine. Examples of tertiary amines include trimethylamine and triethylamine. Examples of quaternary amines include diallyldimethylammonium.

The polymer having such a derivative of a primary to quaternary amine as a monomer may be a polymer of one type of monomer or a copolymer of a plurality of types of monomers. The polymer having a derivative of a primary to quaternary amine as a monomer may be in free form or in salt form. In the case of the salt form, the type of a salt is not particularly limited. Examples of such salts include inorganic acid salts such as hydrochloride, sulfate, nitrate, sulfite and phosphates, and organic acid salts such as formate, acetate, propionate and methanesulfonate and p-toluenesulfonate. In the case of the salt form, the salt may be in the form of a complete salt or in the form of a partial salt.

Representative examples of the zirconium compound include zirconium hydrochloride, zirconium sulfate, zirconium nitrate, and zirconium acetate. All of these dye fixing agents are cationic, and react with the anion of the terminal group of the dye so that the dye is coagulated to exhibit a strong dye fixing action. These dye fixing agents can be used alone or in combination of two or more as needed. Among the dye fixing agents, preferable dye fixing agents are a salt type of a polymer having a derivative of a primary to quaternary amine or the like as a monomer, and polyaluminum chloride, which have a strong dye-fixability.

In the present embodiment, from the viewpoint of increasing the degree of dye fixation on the silver film, the force for coagulating the aqueous dye ink of the dye fixing agent (hereinafter referred to as dye-fixability) is preferably 60% or more, more preferably 80% or more. In a case where the dye-fixability is 60% or more, the dye is easily coagulated with the dye fixing agent, and the dye is likely to stay on the silver film, so that metallic gloss having a brighter arbitrary color tone can be obtained.

The dye-fixability is calculated as follows. First, a liquid mixture in which 0.64 mL of aqueous ink containing a dye is dropped in 1.36 mL of a dye fixing agent with an adjusted concentration of 1% is prepared and stirred. Thereafter, the liquid mixture is filtered through a 0.2 μm filter to remove aggregates, and then the liquid mixture is diluted 1000 times with water to obtain a diluted liquid mixture. The spectrum of the obtained liquid mixture is measured using a spectrophotometer U-3900/3900H (manufactured by Hitachi, Ltd.). Given that the absorbance of the silver ink at a wavelength of 420 nm of the spectrum is Ka and the absorbance of the obtained liquid mixture at a wavelength of 420 nm of the spectrum is Kb, the dye-fixability is expressed by the following formula 2.

$$\text{Dye-fixability} = (Ka - Kb)/Ka \times 100 \quad \text{(Formula 2)}$$

Although the dye-fixability is obtained by the method described above, the dye-fixability may be obtained by the following methods. For example, the methods may include a method of calculating from the change ratio of a turbidity value using a turbidimeter, and a method of calculating from the change ratio of a haze value using a haze meter, and any method may be available as long as the ratio of aqueous dye ink coagulated can be calculated, and the method is not particularly limited.

In the present embodiment, the content of the dye fixing agent in the ink receiving layer is preferably 0.2 $g/m^2$ or more and 5.0 $g/m^2$ or less. It is more preferable that the content of the dye fixing agent be 0.5 $g/m^2$ or more and 3.0 $g/m^2$ or less. The content of the dye fixing agent of 0.2 $g/m^2$ or more causes the dye to easily remain on the silver film, thus making it easy to provide a bright metallic gloss having a bright arbitrary color tone. The content of the dye fixing agent of 5.0 $g/m^2$ or less makes it difficult to deteriorate the image quality of the dye in the area where the metallic gloss is not printed with the silver ink as well as reduce the ink absorbency. The content of the dye fixing agent is not particularly limited as long as it can be measured using various analysis methods, and the organic substances and inorganic substances contained in the dye fixing agent may be analyzed. Examples of the measuring method include ICP mass spectrometry, ICP emission spectrometry, glow discharge mass spectrometry, atomic absorption spectrometry, ion chromatography, and capillary electrophoresis.

The dye fixing agent is not particularly limited as long as it is contained in the ink receiving layer, but in a case where two or more ink receiving layers are provided, the above-mentioned range is preferable for the receiving layer that forms the outermost layer. Further, after forming an ink receiving layer not containing a dye fixing agent, a solution containing a dye fixing agent may be separately coated to form an ink receiving layer in which the content of the dye fixing agent falls within the above-mentioned range.

(Other Additives)

The ink receiving layer may contain other additives than those mentioned above. Specifically, examples of such additives include a pH adjuster, thickener, flow improver, antifoamer, foam inhibitor, surfactant, mold release agent, penetrant, color pigment, color dye, fluorescent whitening agent, ultraviolet light absorption agent, antioxidant, preservative, mildew proofing agent, water proofing agent, dye fixing agent, curing agent, and weathering material.

(Undercoat Layer)

An undercoat layer may be provided between the substrate and the ink receiving layer in order to improve the adhesion between the substrate and the ink receiving layer. The undercoat layer preferably contains a water-soluble polyester resin, gelatin, polyvinyl alcohol or the like. The film thickness of the undercoat layer is preferably 0.01 μm or more and 5 μm or less.

(Backcoat Layer)

A backcoat layer may be provided on the surface of the substrate which is opposite to the surface on which the ink receiving layer is provided for the purpose of improving the handling ability, conveyance aptitude, conveyance scratch resistance during continuous printing with a large number of stacked sheets. The backcoat layer preferably contains a white pigment, a binder and the like. The film thickness of the backcoat layer is preferably set in such a way that the dry coating amount is 1 $g/m^2$ or more and 25 $g/m^2$ or less.

(Mechanism for Forming Metallic Color Image)

Figure 8:
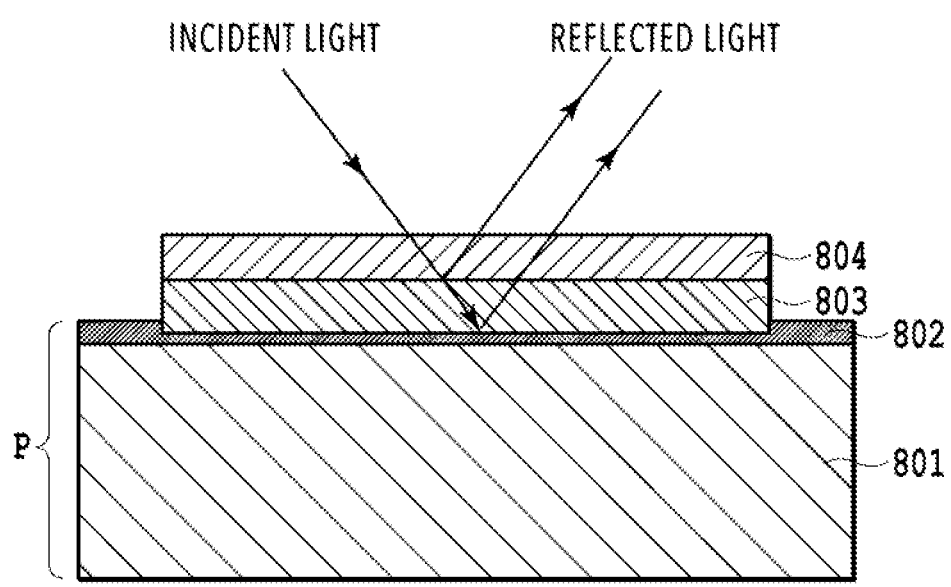
FIG. 8 is a schematic diagram showing an ink application layer in an area that expresses metallic color.

FIG. 8 is a schematic diagram showing an ink application layer in an area that expresses metallic color. A print medium P according to the present embodiment has the aforementioned substrate, 801, and an ink receiving layer 802 containing a dye fixing agent. In the present embodiment, in an area where metallic color is expressed, metallic ink is first applied to the surface of the ink receiving layer 802, after which color ink is applied thereto.

As metallic ink is applied to the surface of the ink receiving layer 802, a solvent contained in the metallic ink dissolves the dye fixing agent contained in the ink receiving layer 802, so that the dye fixing agent is diffused into the moisture of the metallic ink to be mixed with the metal particles in the metallic ink Such dissolution and diffusion are carried out until the moisture contained in the metallic ink disappear from the surface due to volatilization and absorption. As a result, a metallic layer 803 containing a mixture of the dye fixing agent and the metal particles is formed on the surface of the print medium P.

In a case where color ink is further applied to the surface of such a metallic layer 803, the dye fixing agent contained in the metallic layer 803 dissolves again, so that the dye fixing agent is diffused into the color ink to coagulate the dye contained in the color ink As a result, a colored layer 804 containing the dye coagulated by the dye fixing agent is formed on the top layer of the metallic layer 803 containing the mixture of the dye fixing agent and the metal particles. Because the dye according to the present embodiment has transparency, light incident on the surfaces of those layers is separated into light reflecting at the colored layer 804 serving as the top layer and light reflecting at the metallic layer 803 serving as the bottom layer, so that a desired metallic color can be seen visually.

Color ink and metallic ink should not necessarily be applied to the same position to obtain favorable metallic color. For example, metallic color as silver color (achromatic color) may be expressed merely by a metallic layer without using color ink. Even in a case where chromatic metallic color is expressed, an area where color ink is applied may be wider or narrower than an area where the metallic layer is formed as long as color ink is applied to a position where the area partially overlaps the metallic layer.

Incidentally, the dissolution and diffusion of the dye fixing agent accompanying the application of metallic ink, and the evaporation and absorption of water progress with time in the unit of μsec. In a case where color ink is applied before the dye fixing agent is sufficiently dissolved and diffused, the dye of the color ink may not be coagulated on the surface layer, as a result of which a favorable color may not be obtained. On the other hand, in a case where color ink is applied after the moisture of metallic ink has been evaporated or absorbed, the dye of the color ink may permeate through the water-free metallic layer, as a result of which a favorable color may not be also obtained.

FIGS. 9A to 9G are diagrams showing appearance of ink application layers whose application time differences from application of metallic ink to application of color ink are varied variously.

Figure 9A:
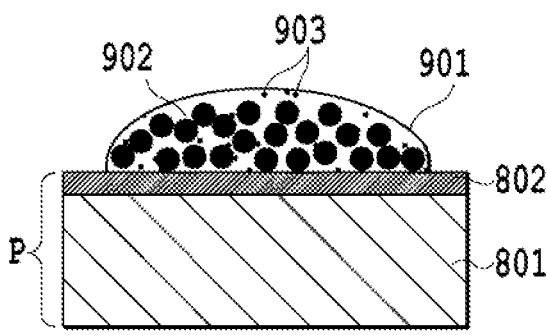
FIGS. 9A to 9G are diagrams showing ink application layers whose application time differences are varied.

FIG. 9A shows a state immediately after metallic ink 901 is applied to the surface of a print medium P on the ink receiving layer 802 side. The metallic ink 901 contains, in addition to metal particles 902, a solvent 903 which promotes the dissolution of the dye fixing agent.

Figure 9B:
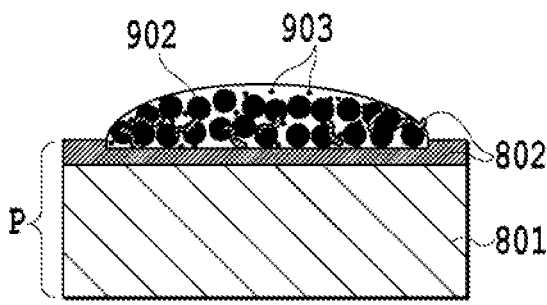

FIG. 9B shows a state transitioned from the state of FIG. 9A after elapsing of a predetermined time. A dye fixing agent 904 contained in the ink receiving layer 802 is dissolved by the solvent 903 contained in the metallic ink 901 and diffused in the metallic ink 901. The thickness of the ink receiving layer 802 in the area to which the metallic ink 901 is applied is slightly reduced due to the dissolution and diffusion of the dye fixing agent 904.

Figure 9E:
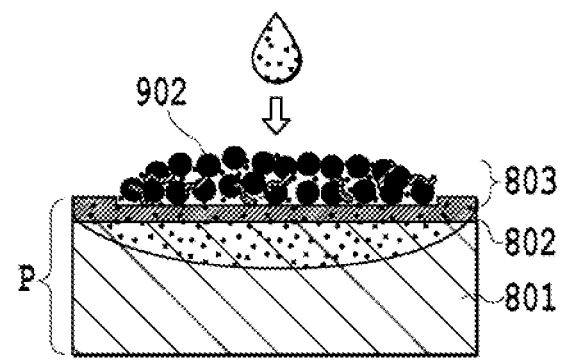
Figure 9C:
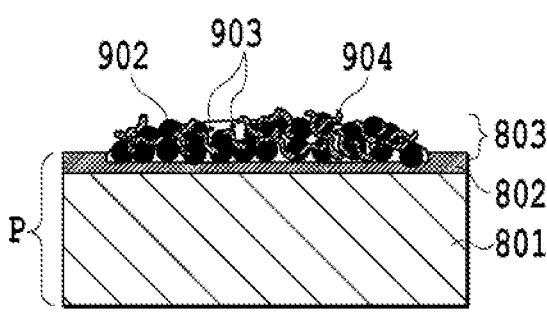

FIG. 9C shows a state transitioned from the state of FIG. 9B after further elapsing of a predetermined time. The dissolution and diffusion of the dye fixing agent 904 further progress, so that the dye fixing agent 904 reaches the surface of the metallic layer 803. Compared with FIG. 9B, the moisture and the solvent 903 in the metallic ink 901 are reduced, and the thickness of the ink receiving layer 802 is also further reduced.

Figure 9F:
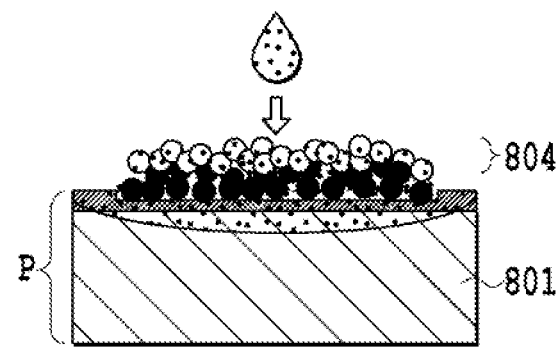
Figure 9D:
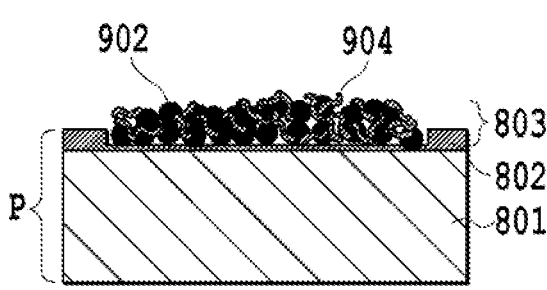

FIG. 9D shows a state transitioned from the state of FIG. 9C after further elapsing of a predetermined time. The dissolution and diffusion of the dye fixing agent 904 further progress, so that most of the dye fixing agent 904 is contained in the metallic layer 803, and the ink receiving layer 802 is thinner. The moisture and the solvent 903 in the metallic ink 901 hardly remain on the surface of the print medium P due to evaporation or permeation.

Figure 9G:
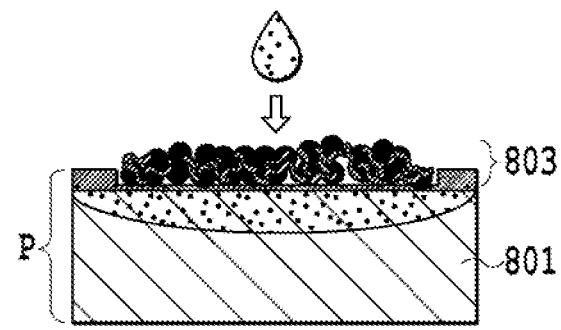

FIGS. 9E to 9G show states in which color ink is applied to the surface of the metallic layer 803 in the states of FIGS. 9B to 9D, respectively. In a case where color ink 905 is applied in the state of FIG. 9B, that is, in the state where the dye fixing agent 904 has not reached the surface layer, a part of the dye is coagulated and fixed in the vicinity of the ink receiving layer 802, but most of the dye together with the moisture permeates the substrate 801 and is fixed therein (FIG. 9C). As a result, light incident on the surface of the print medium P is reflected without reaching the dye layer, so that the metallic color having a color is not recognized in a case of observing the surface.

In a case where the color ink 905 is applied in the state of FIG. 9C, that is, in the state where the dye fixing agent 904 has reached the surface layer and the moisture and the solvent 903 in the metallic ink remain on the surface layer, the dye of the color ink is coagulated in the surface layer or the metallic layer 803 to form the colored layer 804. At this time, the moisture and the solvent 903 remaining in the metallic layer 803 hinder the permeation of the color ink 905 into the substrate 801 and suppress the immediate absorption of the color ink 905 into the substrate 801. Therefore, most of the dye is coagulated and is fixed on the surface or inside of the metallic layer 803 (FIG. 9F). As a result, light incident on the surface of the print medium P is colored by the coagulated dye, so that a metallic color having a sufficient color is recognized.

In a case where the color ink 905 is applied in the state of FIG. 9D, that is, in the state where the moisture and the solvent in the metallic ink hardly remain in the metallic layer, the dye of the color ink 905 together with the moisture permeates through the gaps of the metallic layer 803 and will be absorbed quickly into the substrate 801. As a result, a less amount of the dye is fixed on the surface of the metallic layer as compared with the case of FIG. 9F, and light incident on the surface of the print medium P is reflected without reaching the dye layer. That is, in the case of observing the surface, a metallic color with sufficient color development is not recognized.

Figure 10:
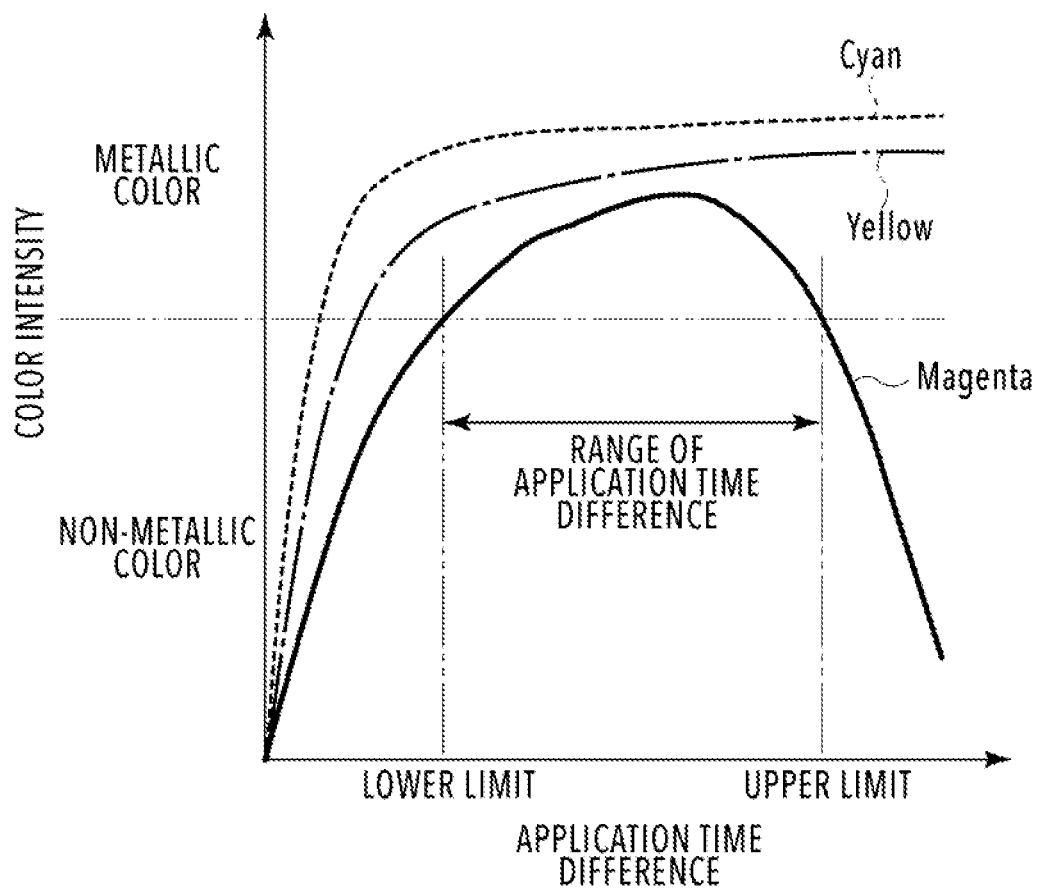
FIG. 10 is a diagram showing a relationship between the application time difference and a color intensity.

FIG. 10 is a diagram showing a relationship between the application time difference between metallic ink and color ink, and the color intensity. The horizontal axis represents the time from the application of the metallic ink to the application of the color ink (application time difference), and the vertical axis represents the color intensity of metallic color represented on a print medium P. Cyan, Magenta, and Yellow show the measurement results in a case where cyan ink, magenta ink, and yellow ink used in the ink cartridge BC-341XL color (manufactured by Canon Inc.) are used as color inks, respectively. The color intensity on the vertical axis herein is the chroma ($\sqrt{(a^*)^2 + (b^*)^2}$) that is determined by a*b* of an L*a*b* color system standardized by the Commission Internationale de l'Eclairage (CIE). As the chroma value becomes larger, the color tone of the ink appears stronger, indicating that the color development is stronger. Although each of the chroma threshold values of metallic color and non-metallic color is set identical for Cyan, Magenta, and Yellow, each threshold value may be set to different values for the respective colors. In a case where a*b* is measured by the SCI (Specula Component Included) method including specular reflected light of an integrating sphere spectrophotometer, the chroma threshold may preferably be set to 20 or more. The chroma of 20 or more is preferable because metallic color in which the color tone of ink appears sufficiently can be visually recognized.

In any of the inks, the color intensity is 0 at the application time difference of 0. This means that in a case where metallic ink and color ink are simultaneously applied to a print medium, the metallic color hardly has chroma (achromatic). Further, for any of the inks, in a case where the application time difference increases from 0, the color intensity also gradually increases. This is because as described with reference to FIGS. 9C and 9F, providing the application time difference allows the dye fixing agent 904 to be dissolved, so that the amount of the dye coagulated on the surface of the metallic layer is increased.

However, the color intensity of magenta has a peak at a predetermined application time difference, and after the peak, the color intensity decreases as the application time difference increases. This is because as described with reference to FIGS. 9D and 9G, in a case where the application time difference becomes too large, the moisture and solvent do not exist in the metallic layer 803, and the dye of the color ink permeates through the metallic layer 803 together with the moisture.

On the other hand, for cyan ink and yellow ink, since the dye itself is more likely to be coagulated than the magenta ink, the dye easily remains on the surface even in a case where the moisture and the solvent do not remain in the metallic layer 803. Therefore, the color intensities of cyan and yellow do not have peaks at a specific application time difference, and monotonously increase to be stable at a constant value.

FIG. 10 shows an area where a sufficient color intensity is obtained and which is defined as metallic color, and an area where the application time difference allows all of the three colors to become metallic color and which is specified by an upper limit and a lower limit. In the present embodiment, the metallic color of every ink is reliably expressed by controlling the application time differences of all the inks to fall within the range between the upper limit and the lower limit in the figure.

For magenta, however, even with respect to the same metallic color, the color intensity changes relatively largely according to the application time difference. Therefore, in a case where there are areas in the same image where the application time difference differs, a variation in color intensity may be confirmed as uneven gloss. In this embodiment, therefore, for metallic color of magenta, the range of the application time difference to such an extent that a variation (unevenness) in color intensity cannot be visually confirmed is further defined as a target range. Such a target range changes depending on the type of a print medium and the components of various inks, and is set in this embodiment to be 2.0 sec or more and 6.0 sec or less. In the present embodiment, a multi-pass printing method is used as a method for making the above-mentioned application time difference fall into the target range.
(Printing Method)

Figure 11A:
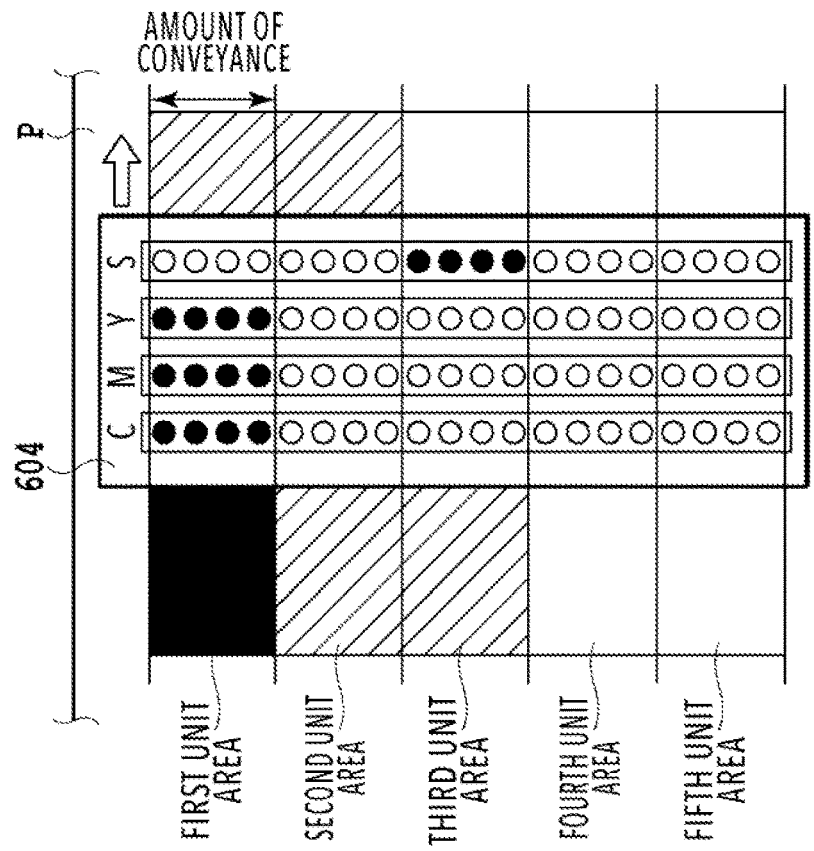
FIGS. 11A and 11B are schematic diagrams of a multi-pass printing method.
Figure 11B:
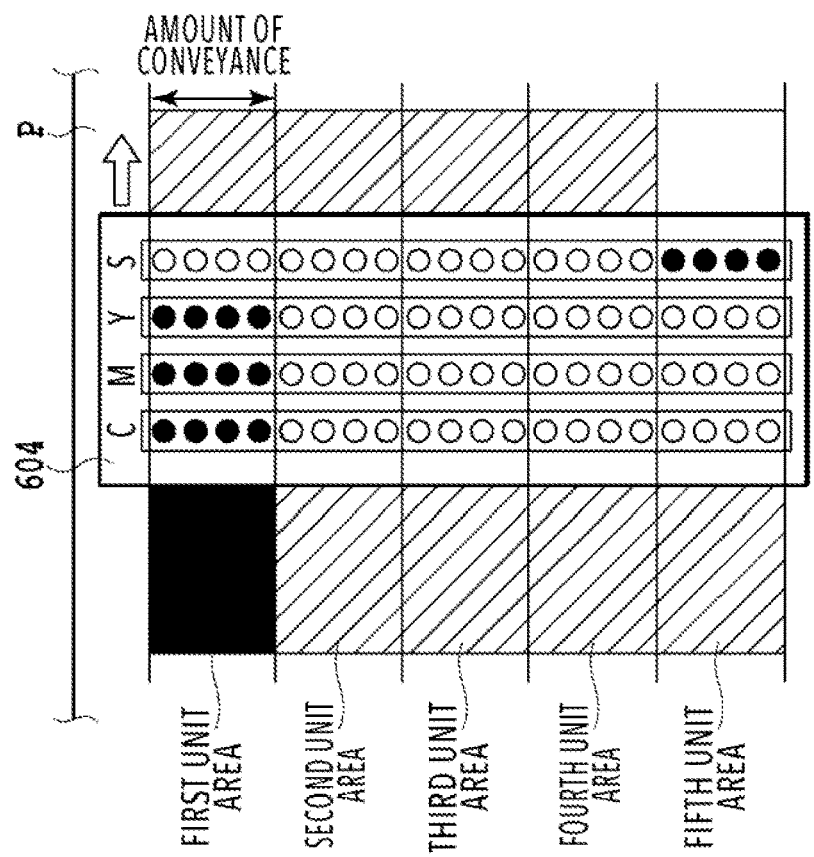

FIGS. 11A and 11B are schematic diagrams for describing a multi-pass printing method in a case of performing metallic color printing in the present embodiment. Ejection opening arrays (CMY) for ejecting cyan, magenta, and yellow color inks and an ejection opening array (S) for ejecting metallic ink are disposed in the print head 604 in parallel in the x-direction (main-scanning direction). Although a larger number of ejection openings are arranged in the actual ejection opening array, it is assumed that the ejection opening array of each color includes 20 ejection openings in order to simplify the description.

FIGS. 11A and 11B show a case where 5-pass multi-pass printing is performed. In the case of 5-pass multi-pass printing, each ejection opening array is divided into 5 blocks of 4 ejection openings. Each time one print scanning is performed, a print medium P is conveyed in the y-direction by a distance corresponding to one block.

In FIG. 11A, black circles indicate ejection openings used for printing, and white circles indicate ejection openings which are not used for printing. With regard to the ejection opening arrays CMY of color inks, an image is printed with a block on the most downstream side (+y-directional side) of the five blocks, and printing is not performed with the other four blocks. With regard to the ejection opening array S of metallic ink, an image is printed with a block on the most upstream side (−y-directional side) of the five blocks, and printing is not performed with the other four blocks. In this manner, after being subjected to a print scanning with metallic ink, each unit area of a print medium P is subjected to a print scanning with color inks after three print scannings without ink application are performed on that unit area.

FIG. 11B shows a state in which the block used for printing in the ejection opening array S is changed from the block used for printing in FIG. 11A. Specifically, only the middle block among the five blocks is used for printing. Accordingly, after being subjected to a print scanning with metallic ink, each unit area of a print medium P is subjected to a print scanning with color inks after one print scanning without ink application is performed on that unit area.

As described above, in this embodiment, multi-pass printing is used to control the order of application of inks to a print medium and the difference in time of applying the inks thereto. Furthermore, the application time difference can also be adjusted using the carriage scanning speed, the scanning width, the pause time for each main-scanning, and the like. The following will describe examples of the printing method that can be implemented in the present embodiment as some exemplary embodiments.

First Embodiment

A description of this exemplary embodiment will be given of a case where the scanning width of the print head 604 is changed according to the width of an image.

Figure 12:
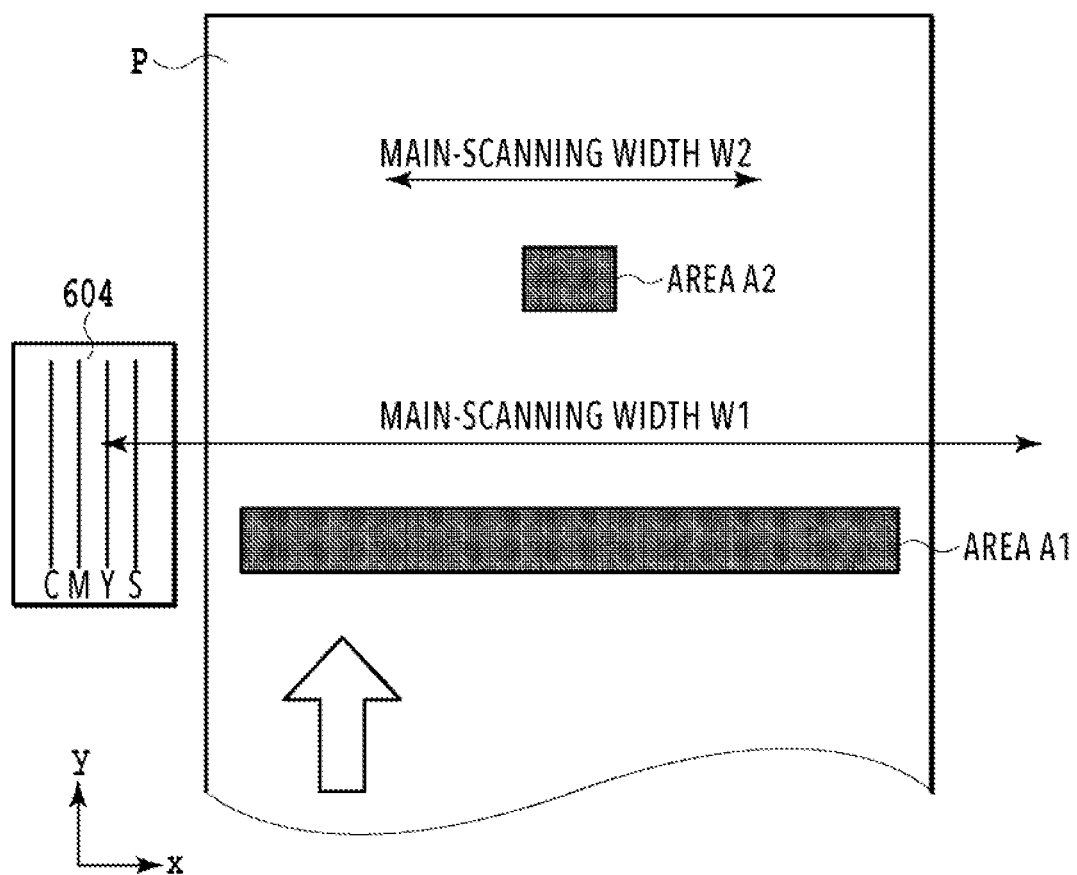
FIG. 12 is a diagram showing a relationship between a width of an image and a scanning width of a print head.

FIG. 12 is a diagram showing a relationship between a width (x-directional size) of an image on a print medium and a scanning width of the print head 604. In a case of printing an image A1 having a width substantially equal to that of the print medium P, the distance (scanning width) by which the print head 604 moves in the x-direction during print scanning is W1. The scanning width W1 is larger than the width of the image A1 because all the four ejection opening arrays CMYS need to move from the right end to the left end of the area A1.

On the other hand, in a case where printing an image A2 having a width sufficiently smaller than the width of the print medium P, it is sufficient for the print head 604 to move in the x-direction by a distance (scanning width) W2. W2 is sufficiently smaller than W1, so that printing of the image A2 can be completed in a shorter time than that of the image A1.

However, in a case where the images A1 and A2 are both of metallic colors, the application time difference for the image A2 becomes smaller than the application time difference for the image A1, which brings about a possibility such that a difference in color intensity between both images may be confirmed. Therefore, in the present exemplary embodiment, the printing method is controlled so as to make the application time difference constant for both images.

FIG. 13 is a diagram for describing a specific example of print operation adoptable in the first exemplary embodiment. The following will describe individual items. The main-scanning width is a distance by which the print head 604 moves in the x-direction to print an image. The main-scanning width W1 described with reference to FIGS. 11A and 11B is 12.0 inch, and the main-scanning width W2 is 5.0 inch. In this exemplary embodiment, operation A in which the main-scanning width is 12.0 inch is regarded as a reference print operation.

The main-scanning speed is the moving speed of the print head 604 (carriage 608) at the time of performing print scanning The main-scanning time indicates the time required for print scanning, and corresponds to a value obtained by dividing the main-scanning width by the main-scanning speed.

The number of non-print scannings indicates the number of print scannings without ink application to individual unit areas in multi-pass printing. For example, the number of non-print scannings is "3" in the case of FIG. 11A, and is "1" in the case of FIG. 11B. The non-print scanning time indicates the time required for a print scanning without ink application, and corresponds to a value obtained by multiplying the main-scanning time by the number of non-print scannings and adding the carriage reversing time to the multiplication result.

The basic application time difference indicates the time from the start of a print scanning with metallic ink to a unit area to the start of a print scanning with color ink without pausing the carriage, and corresponds to a value obtained by adding the main-scanning time to the non-print scanning time.

The inter-scanning head pause time indicates the time for which the carriage 608 is stopped to pause the print head 604 between print scannings Such a pause of the print head 604 is to lower the temperature of the print head 604 which has increased during the print scanning The total head pause time indicates the total time in which the print head 604 is paused between a print scanning in which metallic ink is applied and a print scanning in which color ink is applied. However, in the present exemplary embodiment, the inter-scanning head pause time and the total head pause time are set to 0 for all of the operations A to E.

The actual application time difference indicates the actual time from the start of a print scanning with metallic ink to a unit area to the start of a print scanning with color ink to that unit area, and corresponds to a value obtained by adding the head pause time in the application time difference to the basic application time difference.

In this exemplary embodiment, the actual application time difference for the operation A with a main-scanning width of 12.0 inch is 4.0 sec. In operation B in which the main-scanning width is changed to 5.0 inch from that set in the operation A, the actual application time difference is also reduced to 1.7 sec to meet the reduction in main-scanning width. That is, the application time difference for the operation B is out of the target range of 2.0 sec or more and 6.0 sec or less, so that a preferable metallic color may not be obtained.

Operation C shows a case where the main-scanning speed is changed to 8.0 inch/sec from that set in the operation B. As the main-scanning speed is reduced, the actual application time difference for the operation C increases to 2.5 sec and is included in the target range of 2.0 sec or more and 6.0 sec or less. That is, even in a case where the main-scanning width is smaller than that set in the operation A, the application time difference can fall within the target range by lowering the main-scanning speed, so that a favorable metallic color can be expressed.

Operation D shows a case where the main-scanning speed is further reduced to 5.0 inch/sec from that set in the operation C. The actual application time difference for the operation D is 4.0 sec, which is equal to the actual application time difference for the operation A.

Operation E shows a case where the main-scanning speed is further reduced to 2.5 inch/sec from that set in the operation D. Then, the number of non-print scannings is changed from three to one, that is, the printing state of FIG. 11A is changed to the printing state of FIG. 11B. As a result, the actual application time difference for the operation E also becomes 4.0 sec, and a favorable metallic color can be obtained.

Under the above conditions, in the present exemplary embodiment, the following two printing methods are adopted in order to perform preferable metallic color printing without uneven gloss over the entire image. The first method is a method of maintaining the main-scanning width of the carriage 608 constant regardless of the size of an image in a case where metallic printing is specified.

Figure 14:
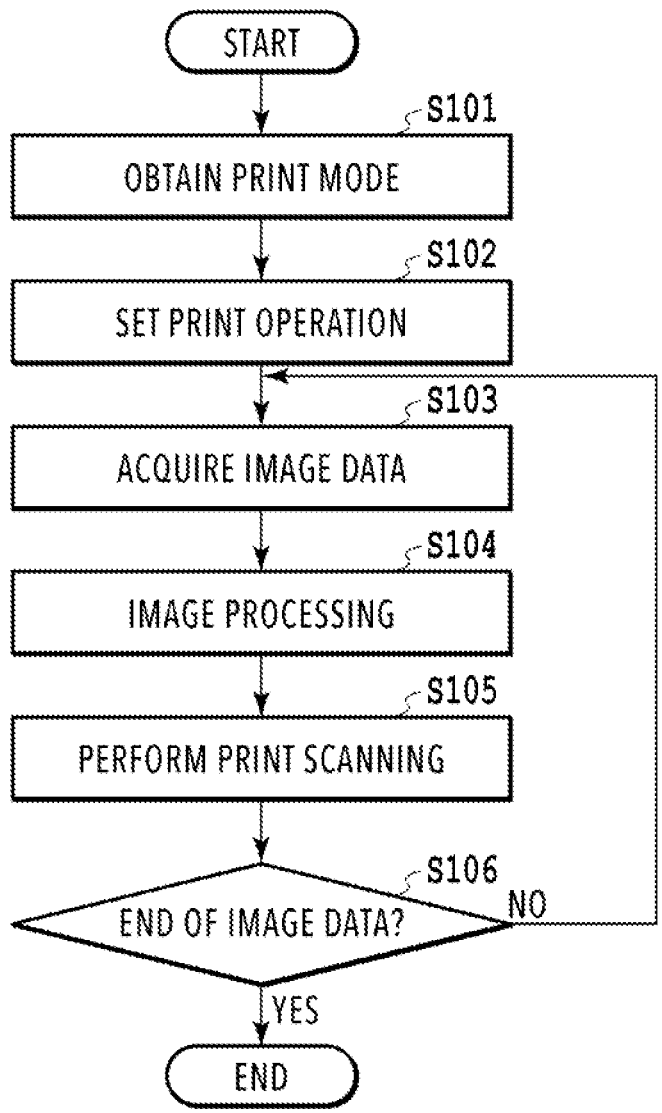
FIG. 14 is a flowchart for describing processes of a routine in the first exemplary embodiment.

FIG. 14 is a flowchart for describing processes of a routine that is executed by the control unit 300 in a case of receiving a print job for metallic printing. More specifically, this routine is the routine that the CPU 302 in the control unit 300 executes using the ASIC 307 according to a program stored in the memory 303.

In a case where this processing is started, the CPU 302 first analyzes a print job received to obtain a print mode at S101. The print mode is specified by parameters that determine the type of a print medium, the level of an image quality, the output speed, the presence or absence of metallic printing, and the like. Such a print mode may be set by a user using the operating panel 110, or may be set in the PC 400, the smartphone 313, or the tablet terminal 314.

At S102, the CPU 302 sets print operation based on the print mode obtained at S101. Specifically, parameters such as the number of multi-passes, the number of blocks of the ejection opening arrays, blocks used for printing in each ejection opening array, and the amount of conveyance for each print scanning are set. Such setting can be achieved, for example, by storing the individual parameters as described above in advance in the memory 303 in association with each print mode.

In the case of this example, as shown in FIG. 11A, 5-pass bi-directional multi-pass printing with three non-print scannings is set. The scanning width (scanning distance) and scanning speed of the carriage in every print scanning are respectively set to 12.0 inch and 12.0 inch/sec shown in operation A in FIG. 13. In the case of bi-directional multi-pass printing, the application time difference between metallic ink and color ink can be made constant regardless of the x-directional position by setting the number of non-print scannings to be an odd number.

At S103, the CPU 302 acquires image data from the print job. The image data acquired at this step is 8-bit RGB data as described with reference to FIG. 5.

At S104, the CPU 302 executes the sequence of image processing described with reference to FIG. 5 on 8-bit RGB data acquired at S103. In the case of this example, since metallic printing is specified by the print mode obtained at S101, multi-value data for metallic ink is input to the gamma correction unit 503, and binary 1-bit data C", M", Y" and S" are output from the quantization unit 504.

At S105, the CPU 302 sends the binary data generated at S104 to the printer engine 304 to cause the printer engine 304 to perform print operation.

At S106, the CPU 302 determines whether there still remains image data to be processed. In a case where image data to be processed remains, the CPU 302 returns to S103 to continue image processing on next image data. On the other hand, in a case where it is determined at S106 that there is no more image data to be processed, this processing is terminated.

According to the first method described with reference to FIG. 14, the carriage scanning width (scanning distance) is set to a constant width of 12.0 inch and the scanning speed is set to a constant speed of 12.0 inch/sec in all the print scannings. As a result, even in a case of performing metallic printing, the application time difference between metallic ink and color ink is set to a constant time of 4.0 sec in all unit areas, and a preferable metallic color without uneven gloss can be expressed in the entire image area.

Next, the second method of this exemplary embodiment will be described. The second method is a method of making the application time difference constant in each unit area while varying the main-scanning width of the carriage 608 according to the size of an image.

Figure 15:
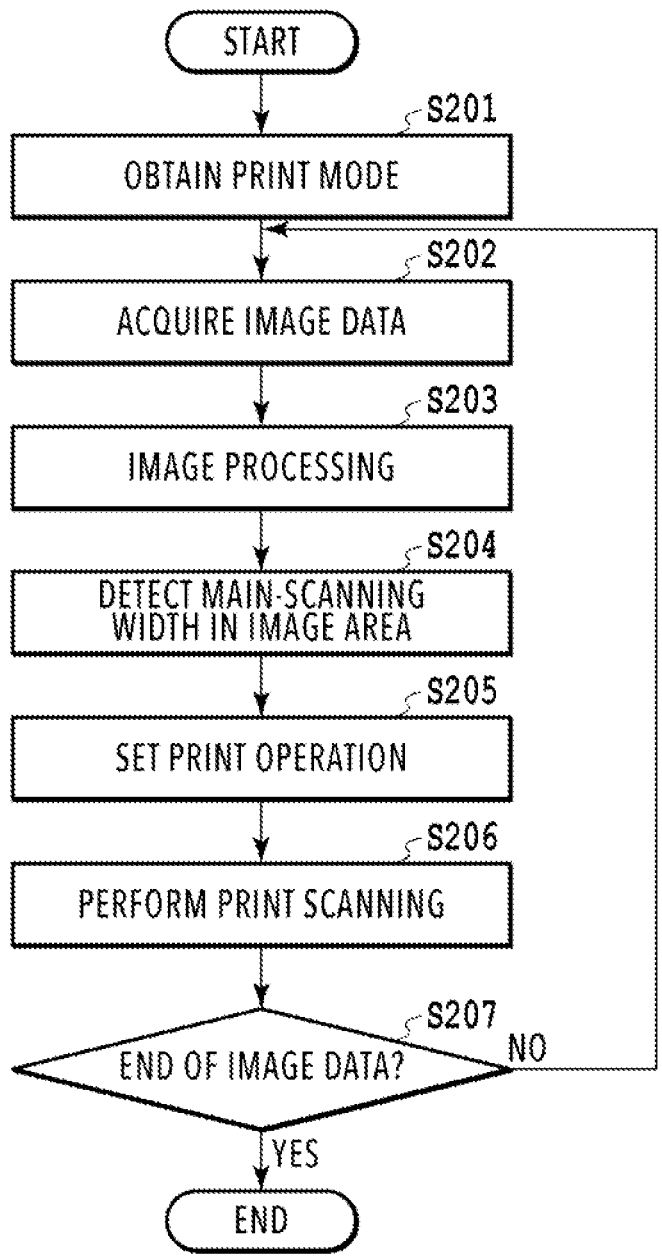
FIG. 15 is a flowchart for describing processes of a routine in the first exemplary embodiment.

FIG. 15 is a flowchart for describing processes of a routine that is executed by the control unit 300 in a case where a print job is generated according to the second method.

In a case where this processing is started, the CPU 302 analyzes a print job to obtain a print mode at S201. It is also assumed in this example that 5-pass bi-directional multi-pass printing shown in FIG. 11A is set.

At S202, the CPU 302 acquires image data of a target area for processing, which corresponds to one print scanning, from the obtained print job. Note that image data of the target area for processing refers to image data of a wider area including an area that can be printed by one print scanning for the convenience of image processing.

At S203, the CPU 302 executes the sequence of image processing described with reference to FIG. 5 on image data of the target area for processing acquired at S202.

At S204, the CPU 302 retrieves the binary data generated at S203, and detects the x-directional width of the image of the target area for processing.

At S205, the CPU 302 determines print operation for the target area for processing based on the x-directional width detected at S204. In this example, in a case where the x-directional width is larger than a prepared threshold value, for example, the operation A shown in FIG. 13 is set. That is, the scanning width is set to 12.0 inch and the main-scanning speed is set to 12.0 inch/sec. On the other hand, in a case where the x-directional width of the image of the target area for processing is equal to or less than the aforementioned threshold value, the operation D shown in FIG. 13 is set. That is, the scanning width is set to 5.0 inch and the main-scanning speed is set to 5.0 inch/sec.

At S206, the CPU 302 sends print data of the target area for processing to the printer engine 304, and performs print operation for one scan corresponding to the target area for processing.

At S207, the CPU 302 determines whether there still remains image data corresponding to a next print scanning In a case where image data to be processed remains, the CPU 302 returns to S202 to acquire image data for one print scanning corresponding to a next target area for processing, and continues the image processing. On the other hand, in a case where it is determined at S207 that there is no more image data to be processed, this processing is terminated.

According to the second method described with reference to FIG. 15, the application time difference between metallic ink and color ink is set to a constant time of 4.0 sec in all unit areas while varying the main-scanning width and the scanning speed of the carriage for each print scanning based on the size of an image to be printed in the x-direction. As a result, it is possible to obtain a preferable metallic color without uneven gloss in the entire image area.

Although, in FIG. 15, the operation D of FIG. 13 is set in a case where the x-directional width of the image of the target area for processing is equal to or less than the threshold value, the present exemplary embodiment is not limited to this case. For example, in a case where the scanning speed of the carriage is too low, the carriage speed may become unstable. In such a case, the operation C may be set instead of the operation D. In the case of the operation C, the actual application time difference is 2.5 sec, even in which case the actual application time difference can fall within the target range of 2.0 sec or more and 6.0 sec or less, thus making it possible to express a preferable metallic color.

Further, the operation E may be set instead of the operation D to suppress the carriage scanning speed to 2.3 inch/sec and reduce the number of non-print scannings to one. In this case, the printing state of the 5-pass multi-pass printing should be switched from the state in FIG. 11A to the state in FIG. 11B. In the operation E, the actual application time difference is set to a constant time of 4.0 sec as in the operation A, thus making it possible to express a preferable metallic color.

Second Embodiment

A description of this exemplary embodiment will be given of a case where the print head is stopped due to the excessive rise in temperature of the print head 604. As described above, the print head according to the present exemplary embodiment is configured so that print operation is paused in a case where the output value of the temperature sensor mounted in the print head has exceeded the threshold value. However, in a case where print operation is suddenly stopped due to rising temperature of the print head while printing metallic color, the application time difference for the area becomes larger than the application time difference for the other area, which may result in occurrence of uneven gloss.

For this reason, in the present exemplary embodiment, a predetermined pause time is provided in advance between print scannings, so that the application time difference for the entire area is made to fall within the target range while suppressing the rise in temperature of the print head. In this example, in a case where the main-scanning width is 12 inch and the main-scanning speed is 12 inch/sec, it is preferable to set the pause time to 0.5 sec or more between print scannings in order to maintain the temperature of the print head at a preferable temperature.

FIG. 16 is a diagram for describing specific examples of print operation adoptable in the second exemplary embodiment. Operation A is the same as the operation A shown in FIG. 13. Operation G shows a case where a pause time of 1.0 sec is provided between individual print scannings in the operation A. Since this exemplary embodiment is directed to 5-pass multi-pass printing, four pauses are inserted between five print scannings for each unit area. Therefore, the actual application time difference for the operation G is 8.0 sec, which exceeds the target range of 2.0 or more and 6.0 sec or less.

Operation H shows a case where the number of non-print scannings is changed from three in the operation G to one, that is, the printing state is changed from the printing state in FIG. 11A to the printing state in FIG. 11B. Reducing the number of non-print scannings to one suppresses the actual application time difference to 4.0 sec, which is the same as that in the operation A even with a pause time of 1.0 sec provided for each print scan.

Operation I shows a case where the pause time is reduced from 1.0 sec as set in the operation H to 0.5 sec. Suppressing the pause time to 0.5 sec permits the actual application time difference to become 3.0 sec smaller than the one set in the operation H. Even in such operation I, the actual application time difference falls within the target range of 2.0 sec or more and 6.0 sec or less, so that a favorable metallic color can be expressed.

On the other hand, operations J and K show cases where the main-scanning speed of the print head 604 is 24.0 inch/sec, which is twice the main-scanning speed set in the operations A to I. In addition, the number of non-print scannings is set to seven in the operations J and K. The multi-pass printing in which the number of non-print scannings is set to seven can be achieved by, for example, the printing method as shown in FIG. 22A.

In the operation J, as compared with the operation A, the basic application time difference decreases with an increase in the main-scanning speed, but the number of non-print scannings is increased from 3 times to 7 times, so that the actual application time difference becomes 4.0 sec, which is the same as that in the operation A.

The operation K shows a case where an additional pause time of 1.5 sec is provided for the pause time in the operation J. In a case where the scanning speed is increased as in the operations J to M, the frequency at which ink is ejected is doubled, and the temperature of the print head is likely to become high. Accordingly, the pause time of about 0.5 sec, which is effective at a main-scanning speed of 12.0 inch/sec, may not be sufficient at a main-scanning speed of 24.0 inch/sec. In the operation K, therefore, the pause time is increased to 1.5 sec. However, increasing the pause time to 1.5 sec causes the actual application time difference to become 16.0 sec, which excessively exceeds the target range of 2.0 sec or more and 6.0 sec or less.

The operation L shows a case where the number of non-print scannings is reduced to one while the pause time is 1.5 seconds. Reducing the number of non-print scannings to one allows the actual application time difference to become 4.0 sec, which is the same as the one set in the operation A.

The operation M shows a case where the pause time is changed to 2.0 sec from the pause time in the operation L. Even in a case where the pause time is increased to 2.0 sec, the number of non-print scannings is reduced to one, so that the actual application time difference of 5.0 sec falls within the target range, thus making it possible to express a favorable metallic color.

Figure 17:
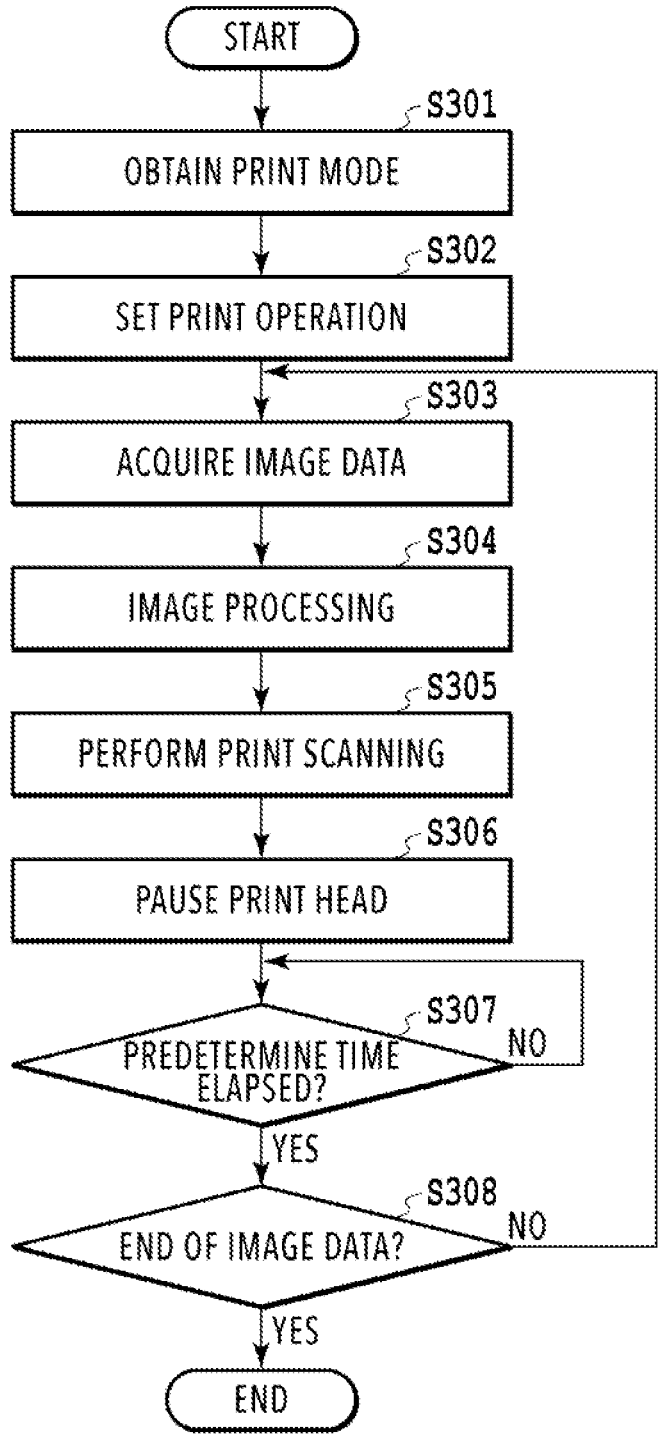
FIG. 17 is a flowchart for describing processes of a routine in the second exemplary embodiment.

FIG. 17 is a flowchart for describing processes of a routine that is executed by the control unit 300 according to this exemplary embodiment in a case where a print job is generated. Although, among the print operations described above, the print operations A, H, I, J, L, and M in which the actual application time difference falls within the target range can be adopted in the present exemplary embodiment, the following description will be given of an example where the operation H in which a rise in temperature of the print head can be sufficiently suppressed is adopted.

In a case where this processing is started, the CPU 302 analyzes a print job to obtain a print mode in S301.

At S302, the CPU 302 sets a print operation based on the obtained print job. Specifically, individual parameters are set in such a way as to implement the operation H in the 5-pass bi-directional multi-pass printing with one non-print scanning as shown in FIG. 11B.

At S303, the CPU 302 acquires image data of a target area for processing corresponding to one print scanning from the obtained print job. In the present exemplary embodiment, image data of the target area for processing also refers to image data of a wider area including an area which is printable in one print scanning for the convenience of image processing.

At S304, the CPU 302 executes a sequence of image processing described with reference to FIG. 5 on image data of the target area for processing acquired at S303.

At S305, the CPU 302 sends 1-bit data generated at S304 to the printer engine 304, and causes the printer engine 304 to perform one print operation according to the print operation H set at S302. That is, print scanning is performed across a width of 12.0 inch at a main-scanning speed of 12.0 inch/sec.

In a case where one print scanning at S305 is completed, the CPU 302 stops the carriage 608 to pause the print head 604 (S306).

At S307, the CPU 302 determines whether a predetermined time (1.0 sec) has elapsed since the stopping of the carriage. Then, the CPU 302 stands by with the carriage 608 stopped until it can be determined that the predetermined time (1.0 sec) has elapsed. In a case where it is determined at S307 that the predetermined time has elapsed, the CPU 302 proceeds to S308.

At S308, the CPU 302 determines whether there still remains image data to be processed. In a case where image data to be processed remains, the CPU 302 returns to S303 to continue image processing for next image data. On the other hand, in a case where it is determined that there is no further image data to be processed, the present processing is terminated.

According to the present exemplary embodiment described above, providing a constant pause time between the individual print scannings makes it possible to set the application time difference between metallic ink and color ink to a constant time while suppressing a rise in temperature of the print head, so that metallic color without uneven gloss can be expressed over the entire image area.

Third Embodiment

A description of this exemplary embodiment will be given of a case where print operation is changed depending on whether metallic printing is specified.

Figure 18:
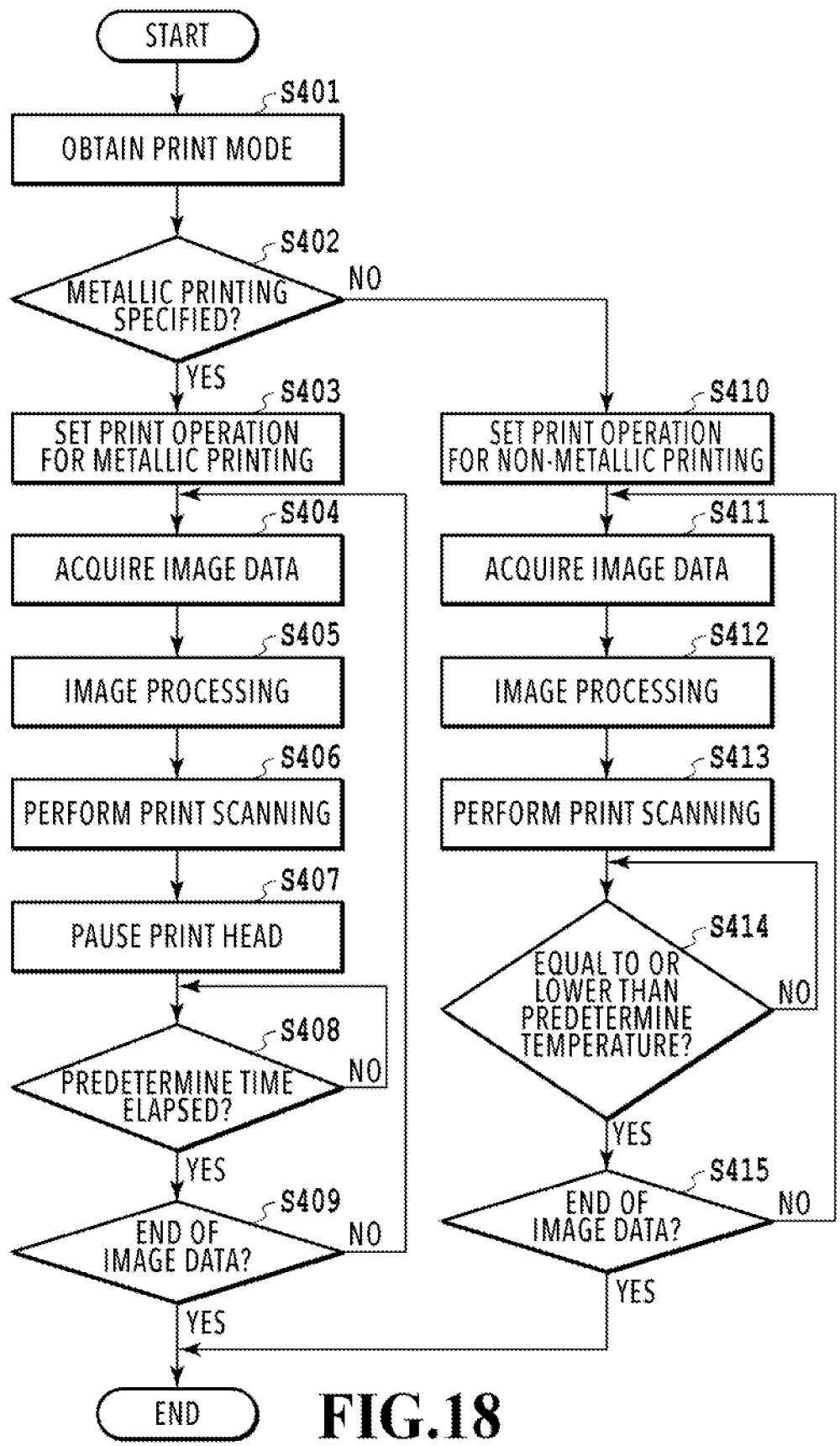
FIG. 18 is a flowchart for describing processes of a routine in a third exemplary embodiment.

FIG. 18 is a flowchart for describing processes of a routine that is executed by the control unit 300 according to this exemplary embodiment in a case where a print job is generated. As this routine is started, the CPU 302 first analyzes the print job and obtains a print mode at S401.

At S402, the CPU 302 determines whether the print mode specifies metallic printing. In a case where metallic printing is specified, the CPU 302 proceeds to step S403. In a case where metallic printing is not specified, the CPU 302 proceeds to step S410.

At S403, the CPU 302 sets a print operation for metallic printing. It is assumed herein that print operation similar to the operation H set in the third exemplary embodiment is set. Since the following steps S404 to S409 are the same as S303 to S308 in the flowchart described with reference to FIG. 17, their redundant descriptions will be avoided below.

At S410, the CPU 302 sets print operation for non-metallic printing. In non-metallic printing, since an output image is not affected by the application time difference between metallic ink and color ink, it is possible to set print operation giving priority to the output speed. Specifically, it is possible to set one-pass printing in which all the ejection openings are used for color ink and all the ejection openings are not used for metallic ink FIG. 22B shows the printing state of such one-pass printing. In one-pass printing, each time one print scanning is performed, a print medium P is conveyed in the y-direction by a distance corresponding to the length of an ejection opening array.

In non-metallic printing, as described in FIG. 13, the print scanning width of each print scanning may be changed according to the x-directional width of a target image for processing. Furthermore, the scanning speed of each print scanning may be set higher than that for metallic printing.

At S411, the CPU 302 acquires image data of a target area for processing corresponding to one print scanning from the obtained print job. In this case, it is also preferable to acquire image data of a wider area than that targeted in one print scanning for the convenience of image processing.

At S412, the CPU 302 performs a sequence of image processing described with reference to FIG. 5 on the image data of the target area for processing acquired at S411. Since the print mode does not specify metallic printing, multi-value data for metallic ink is not input to the gamma correction unit 503, and the output data of the quantization unit 504 becomes binary 1-bit data C", M" and Y".

At S413, the CPU 302 sends 1-bit data generated at S412 to the printer engine 304 and causes the printer engine 304 to execute print operation.

At S414, the CPU 302 acquires the temperature of the print head 604 via the head temperature detection circuit E3002, and determines whether the acquired temperature is equal to or lower than a predetermined temperature. The predetermined temperature is an upper limit temperature of the print head 604 for stably performing ejection operation. The temperature detection and the determination at S414 are repeated until it can be determined that the temperature of the print head is equal to or lower than the predetermined temperature. In a case where it is determined at S414 that the temperature of the print head is equal to or lower than the predetermined temperature, the CPU 302 proceeds to S415.

At S415, the CPU 302 determines whether there still remains image data to be processed. In a case where image data to be processed remains, the CPU 302 returns to S411, and continues image processing on next image data. On the other hand, in a case where it is determined that there is no more image data to be processed, this processing is terminated.

According to the present exemplary embodiment described above, in a case where metallic printing is specified, the print head pauses for a given time for each print scanning regardless of the temperature of the print head. Therefore, it is possible to maintain a constant application time difference between metallic ink and color ink while avoiding a rise in temperature of the print head, so that a metallic color without uneven gloss can be printed.

On the other hand, in a case where metallic printing is not specified, the print head is paused only in a case where the temperature of the print head has exceeded the predetermined temperature, and print scanning is repeated continuously without any pause in a case where the temperature of the print head does not exceed the predetermined temperature. This can shorten the time of outputting an image.

In a case of printing only with metallic ink without using color ink even in metallic printing, printing may be performed in the print operation for metallic printing at and following S403, or printing may be performed in the print operation for non-metallic printing at and following S410. Note that even in a case of printing only with metallic ink, printing is not affected by the application time difference between metallic ink and color ink, so that from the viewpoint of throughput, it is preferable to set printing operation for non-metallic printing.

Fourth Embodiment

A description of the present exemplary embodiment will be given of a case where a metallic color area and a non-metallic color area are mixed on the same page.

Figure 19:
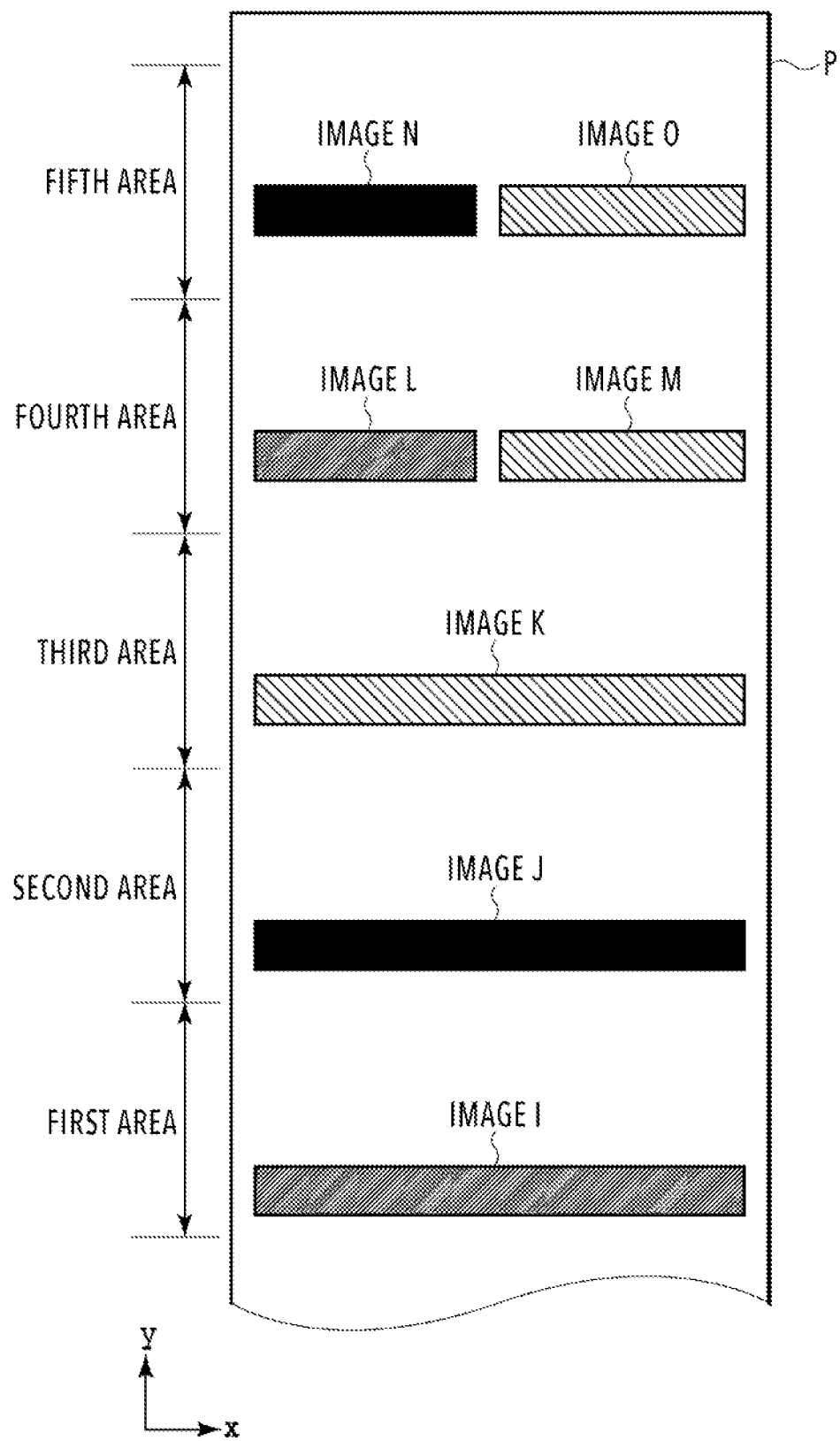
FIG. 19 shows an example of an image where metallic color and non-metallic color are mixed.

FIG. 19 is a diagram showing an example of an image where a metallic color area and a non-metallic color area are mixed. In the figure, an image I is a metallic color image which extends substantially across the entire widthwise area of a print medium P. An image J is a silver image that extends substantially across the entire widthwise area of a print medium P. A silver image refers to an achromatic image having metallic gloss which is printed only with metallic ink and without using color ink. An image K is a color image that extends substantially across the entire widthwise area of a print medium P. A color image refers to an image printed only with color ink and without using metallic ink An image L and an image M are respectively a metallic color image and a color image which are juxtaposed to each other in an area printable through one print scanning by the print head. An image N and an image O are respectively a silver image and a color image which are juxtaposed to each other in an area printable through one print scanning by the print head.

In this exemplary embodiment, print operation can be changed for each unit area so that each image is printed by an appropriate method. For example, for a first area including only the metallic color image I, an image is printed by the print operation H described with reference to FIG. 16. For a second area including only the silver image J, an image is printed through one-pass printing using all the ejection openings of the ejection opening array S for metallic ink For a third area including only the color image K, an image is printed through one-pass printing using all the ejection openings of the ejection opening arrays CMY for color inks.

On the other hand, for a fourth area including the metallic color image L and the color image M, with priority given to the image quality of the metallic color image over high speed printing, an image is printed by the print operation H. A fifth area including the silver image N and the color image O does not include a metallic color image affected by the application time difference. Therefore, with priority given to high speed, an image is printed through one-pass printing using all the ejection openings of the ejection opening array S for metallic ink and the ejection opening arrays CMY for color inks.

Figure 20:
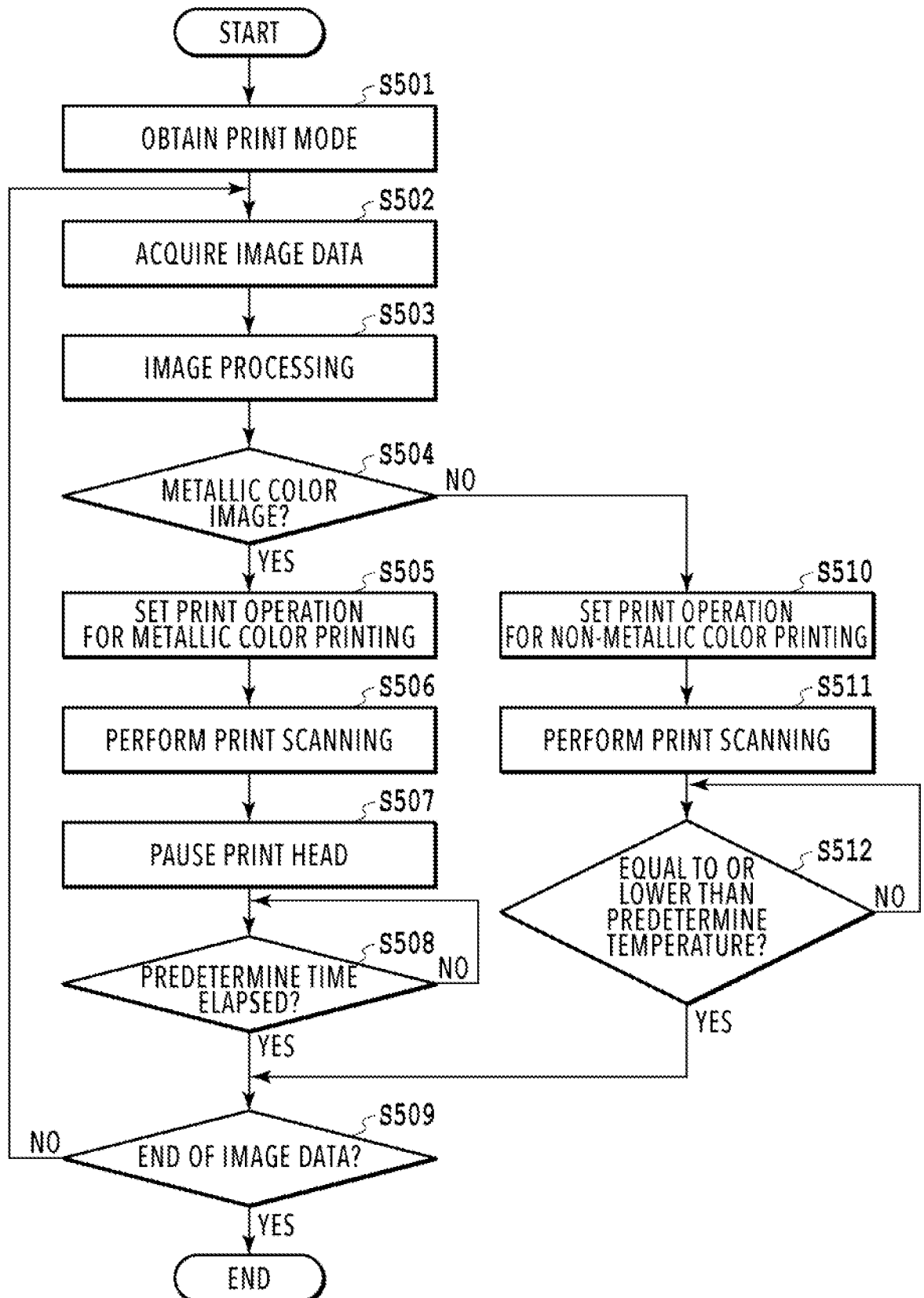
FIG. 20 is a flowchart for describing processes of a routine in a fourth exemplary embodiment.

FIG. 20 is a flowchart for describing processes of a routine that is executed by the control unit 300 according to this exemplary embodiment in a case where a print job is generated. As this routine is started, the CPU 302 first analyzes the print job and obtains a print mode at S501.

At S502, the CPU 302 acquires image data of one area. At S503, the CPU 302 performs a sequence of image processing described with reference to FIG. 5 on the image data of the target area for processing acquired at S502.

At S504, the CPU 302 determines whether the image data to be processed includes a metallic color image. The CPU 302 proceeds to step S505 in a case where the metallic color image is included, and proceeds to step S510 in a case where the metallic color image is not included. In the case of FIG. 19, the CPU 302 proceeds to S505 in a case where the target area for processing is the area 1 or the area 4, and proceeds to S510 in a case where the target area for processing is the area 2, the area 3 or the area 5.

At S505, the CPU 302 sets print operation for metallic printing. It is assumed herein that print operation similar to the operation H set in the third exemplary embodiment is set. Then, at S506, one print scanning is performed in accordance with the print operation set at S505.

In a case where one print scanning at S506 is completed, the CPU 302 stops the carriage 608 and pauses the print head 604 at S507.

At S508, the CPU 302 determines whether a predetermined time (1.0 sec) has elapsed since the carriage was stopped at S507. Then, the CPU 302 sands by with the carriage 608 stopped until it can be determined that the predetermined time (1.0 sec) has elapsed. In a case where it is determined at S508 that the predetermined time has elapsed, the CPU 302 proceeds to S509.

At S510, the CPU 302 sets the print operation for non-metallic printing. At this step, one-pass printing using all the ejection openings of the ejection opening array S for metallic ink and the ejection opening arrays CMY for color ink is set. Then, at S511, the CPU 302 performs one print scanning in accordance with the print operation set at S510.

At S512, the CPU 302 acquires the temperature of the print head 604 via the head temperature detection circuit E3002, and determines whether the acquired temperature is equal to or lower than a predetermined temperature. Then, the detection of the temperature of the print head 604 and the determination at S512 are repeated until it can be determined that the temperature of the print head is equal to or lower than the predetermined temperature. In a case where it is determined at S512 that the temperature of the print head is equal to or lower than the predetermined temperature, the CPU 302 proceeds to S509.

At S509, the CPU 302 determines whether there still remains image data to be processed. In a case where image data to be processed remains, the CPU 302 returns to S502, and image processing on next image data is continued. On the other hand, in a case where it is determined that there is no more image data to be processed, the present processing is terminated.

According to the exemplary embodiment described above, in the area including a metallic color image, a constant pause time is provided for each print scanning regardless of the temperature of the print head. Therefore, the application time difference between metallic ink and color ink can be kept constant, and metallic color without uneven gloss can be expressed.

On the other hand, in the area where an metallic color image is not included, the print head is paused only in a case where the temperature of the print head has exceeded the predetermined temperature, and print scanning is repeated continuously without pausing the print head in a case where the temperature of the print head does not exceed the predetermined temperature. This can shorten the time for outputting an image.

According to the present exemplary embodiment, it is possible to perform metallic printing at higher speed as compared with the third exemplary embodiment in which print operation is switched for each print mode while expressing metallic color without uneven gloss.

Fifth Embodiment

A description of this exemplary embodiment will be given of a case where print operation is varied depending on the type of a dye used for a metallic color image.

As already described with reference to FIG. 10, among the three color inks used in the present exemplary embodiment, only the magenta ink has a peak in light emission intensity. With regard to the cyan ink and the yellow ink, in a case where the application time difference is equal to or more than the lower limit value, a favorable color intensity can be stably obtained even in a case where the application time difference varies somewhat.

In the present exemplary embodiment, therefore, print operation in which the application time difference is made constant is set only in a case where an metallic color image is an image containing magenta. For a metallic color image which does not contain magenta, print operation in which priority is given to the output speed, such as one-pass printing, is set.

Figure 21:
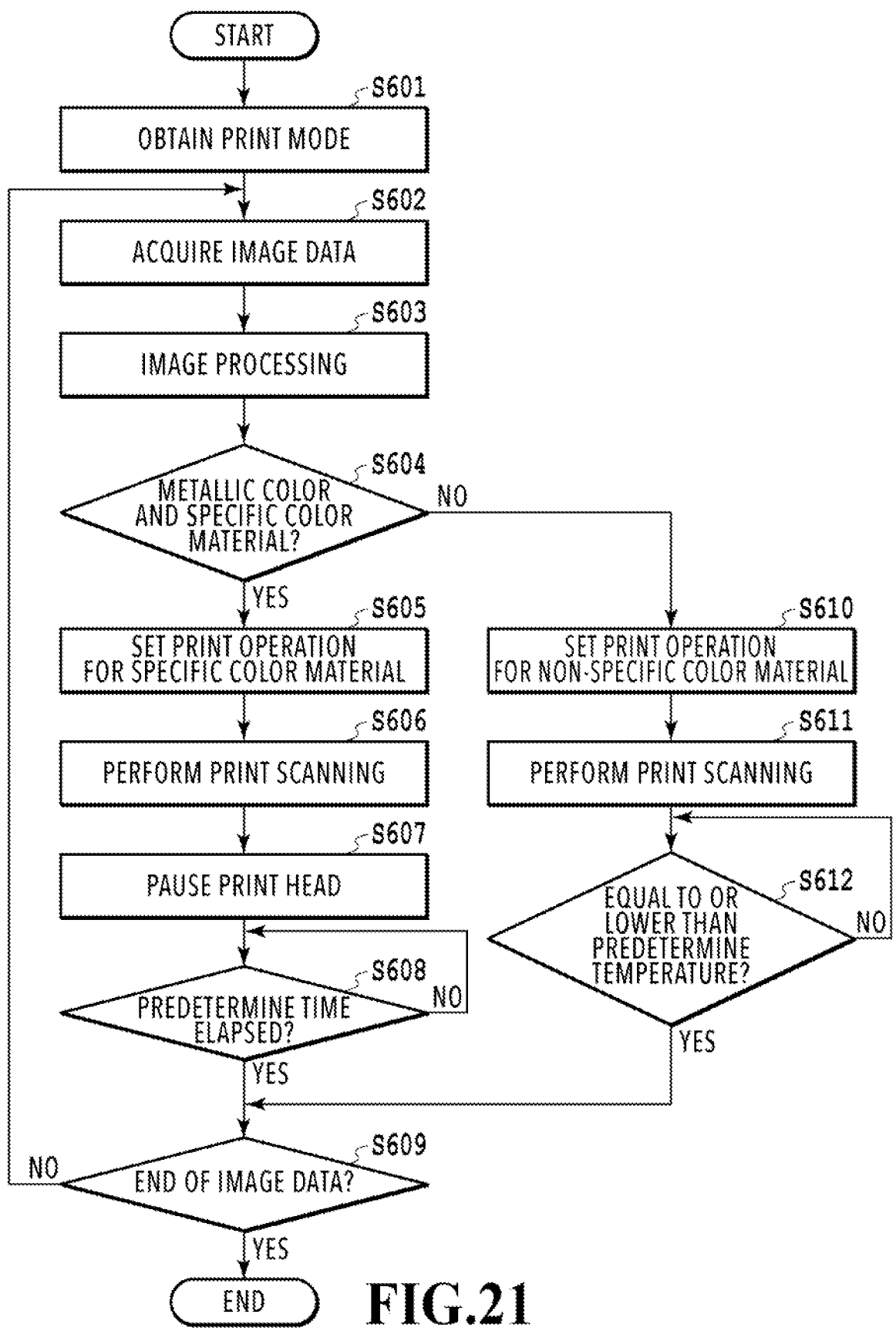
FIG. 21 is a flowchart for describing processes of a routine in a fifth exemplary embodiment.

FIG. 21 is a flowchart for describing processes of a routine that is executed by the control unit 300 according to this exemplary embodiment in a case where a print job is generated. As this routine is started, the CPU 302 first analyzes the print job and obtains a print mode at S601.

At S602, the CPU 302 acquires image data of one area. At S603, the CPU 302 executes the sequence of image processing described with reference to FIG. 5 on the image data of the target area for processing acquired at S602.

At S604, the CPU 302 determines whether the image data to be processed includes data for a specific color material (magenta). Specifically, based on the binary data generated at S603, it is determined whether there is an area in which metallic ink and magenta ink are printed in an overlapped manner or are printed nearby. In the case of Yes, the CPU 302 proceeds to S605, and in the case of No, the CPU 302 proceeds to S610.

At S605, the CPU 302 sets print operation for metallic color printing that includes a specific color material (magenta). It is assumed here that operation similar to the operation H set in the third exemplary embodiment is set. At S606, one print scanning is performed in accordance with the print operation set at S605.

In a case where one print scanning at S606 is completed, the CPU 302 stops the carriage 608 to pause the print head 604 at S607.

At S608, the CPU 302 determines whether a predetermined time (1.0 sec) has elapsed since the carriage was stopped. Then, the CPU 302 stands by with the carriage 608 stopped until it can be determined that the predetermined time (1.0 sec) has elapsed. In a case where it is determined at S608 that the predetermined time has elapsed, the CPU 302 proceeds to S609.

At S610, the CPU 302 sets print operation for an image that is not of the metallic color of a specific color material (magenta). At this step, one-pass printing using all the ejection openings of the ejection opening array S for metallic ink and the ejection opening arrays CMY for color inks is set. Thereafter, at S611, the CPU 302 performs one print scanning in accordance with the print operation set at S610.

At S612, the CPU 302 acquires the temperature of the print head 604 via the head temperature detection circuit E3002, and determines whether the acquired temperature is equal to or lower than a predetermined temperature. Then, the detection of the temperature of the print head 604 and the determination at S612 are repeated until it can be determined that the temperature of the print head 604 is equal to or lower than a predetermined temperature. In a case where it is determined at S612 that the temperature of the print head is equal to or lower than the predetermined temperature, the CPU 302 proceeds to S609.

At S609, the CPU 302 determines whether there still remains image data to be processed. In a case where image data to be processed remains, the CPU 302 returns to S602 to continue image processing on next image data. On the other hand, in a case where it is determined that there is no more image data to be processed, the present processing is terminated.

According to the present exemplary embodiment described above, only for a metallic color image of a specific dye (magenta) which is affected by a variation in application time difference, a constant pause time is provided for each print scanning regardless of the temperature of the print head. On the other hand, for an image area that does not use a specific dye (magenta) even in non-metallic color or metallic color, the print head is paused only in a case where the temperature of the print head has exceeded a predetermined temperature, and print scanning is repeated without pausing the print head in a case where the temperature of the print head does not exceed the predetermined temperature. According to the present exemplary embodiment, it is possible to output a metallic image at a higher speed than the print speed in the above-described exemplary embodiments while expressing a metallic color without uneven gloss.

Other Embodiments

Figure 23A:
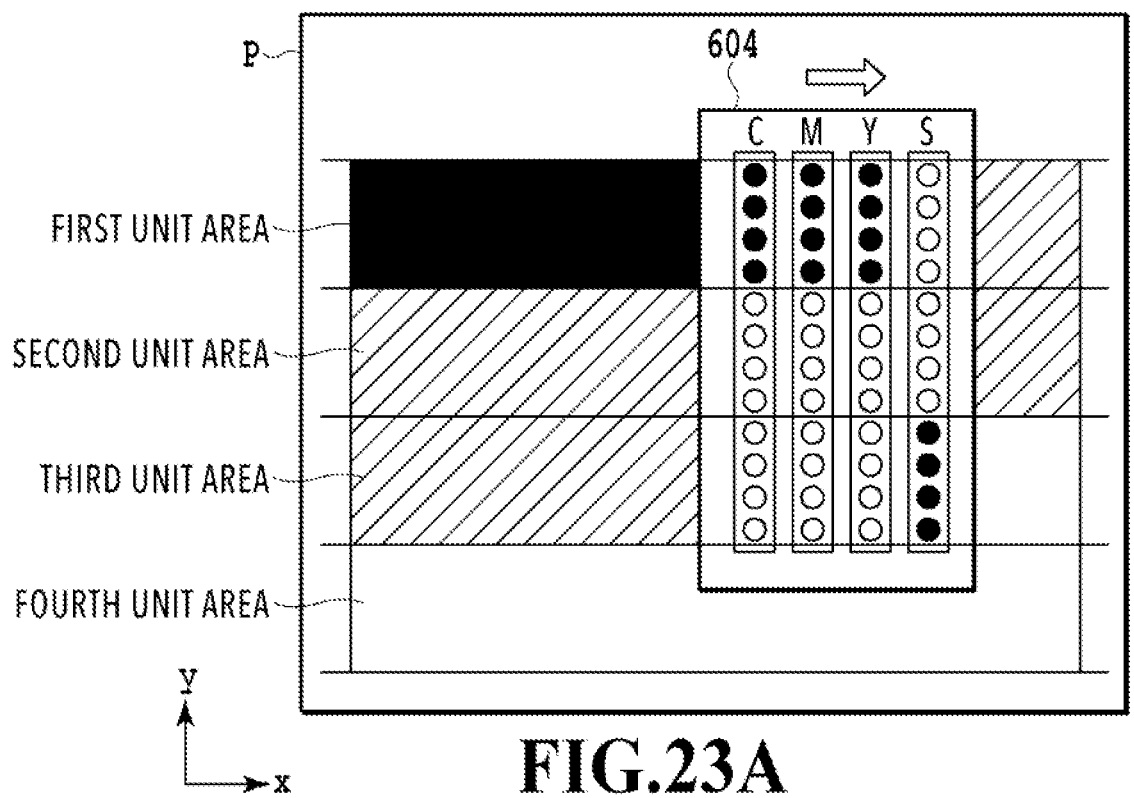
FIGS. 23A and 23B are diagrams showing further examples of multi-pass printing.
Figure 23B:
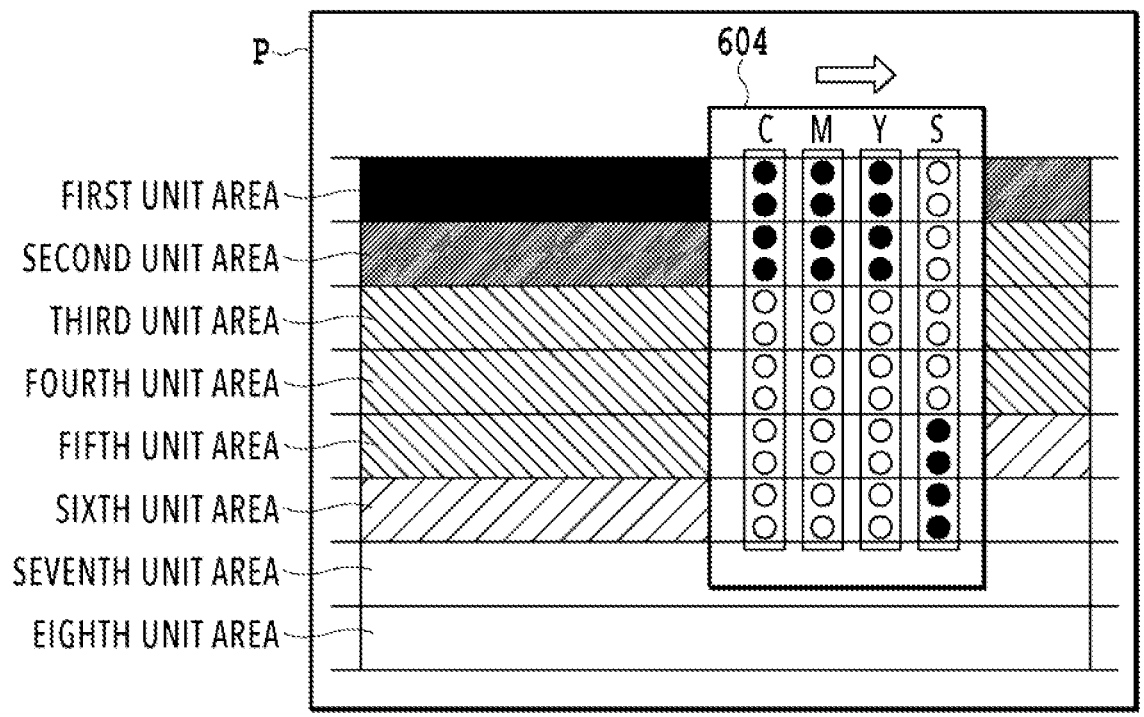

Although the foregoing exemplary embodiments have been described with reference to a case of adopting a 5-pass bidirectional multi-pass printing method by way of example, the multi-pass printing method is not limited to this type. FIGS. 23A and 23B are schematic diagrams for describing different examples of multi-pass printing. FIG. 23A shows an example of 3-pass multi-pass printing, and FIG. 23B shows an example of 6-pass multi-pass printing.

In a case of FIG. 23A, after being subjected to a print scanning with metallic ink, each unit area of a print medium P is subjected to a print scanning with color inks after one print scanning without ink application is performed on that unit area. In this case, as in the case of FIG. 11B referred to in the description of 5-pass multi-pass printing, the number of non-print scannings also becomes "1."

FIG. 23B shows a case where metallic ink and color inks are each applied to each unit area in a plurality of print scannings The following will describe the printing method shown in FIG. 23B in detail. In the case of 6-pass multi-pass printing, each ejection opening array is divided into 6 blocks. In the case of this example, with regard to the ejection opening arrays CMY of color inks, an image is printed with two blocks on the most downstream side (+y-directional side) of the six blocks in an allocated manner, and printing is not performed with the other four blocks. With regard to the ejection opening array S of metallic ink, an image is printed with two blocks on the most upstream side (−y-directional side) of the six blocks in an allocated manner, and printing is not performed with the other four blocks.

According to such multi-pass printing, after being subjected to two print scannings with metallic ink, each unit area of a print medium P is subjected to two print scannings with color inks after two print scannings without ink application are performed on that unit area. Even in such multi-pass printing, a favorable metallic color without uneven gloss can be expressed by making constant the time difference from a print scanning in which metallic ink is applied first to a print scanning in which color inks are applied first between unit areas.

In multi-pass printing, unidirectional printing may be adopted in which print scanning is always in the same direction. In the case of unidirectional printing, it is necessary to cause the carriage to perform back scan between individual print scannings, and this time can also be used as the pause time described in the descriptions of the foregoing embodiments. In the case of unidirectional multi-pass printing, the application time difference between metallic ink and color ink may be made constant irrespective of in the x-directional position, and regardless of whether the number of non-print scannings is odd or even.

Further, in the above exemplary embodiment, the carriage is stopped to pause print operation for the purpose of lowering the increased temperature of the print head. However, the carriage may be stopped for other purposes than this purpose. For example, in the middle of print operation, the print head 604 may be moved to the position of the maintenance unit 613 to perform preliminary ejection not related to image data in order to stabilize the ejection states of the ejection openings having a low ejection frequency.

In a case where such preliminary ejection operation is carried out suddenly in a plurality of print scannings, the application time difference for an area to which metallic ink and color ink are applied before and after the preliminary ejection operation may become greater than the application time difference for other areas, which brings about a concern of uneven gloss. In such a case, therefore, the preliminary ejection operation should be set in advance in such a way that the preliminary ejection operation is performed for every print scanning This setting makes it possible to make constant the application time difference between metallic ink and color ink while keeping the ejection state of the print head normally, thereby ensuring expression of metallic color without uneven gloss over the entire image area.

In the above, since inks having the characteristics shown in FIG. 10 in the relationship between the application time difference and the color intensity are used as color inks, only magenta is set as a specific dye, and the target range is set to 2.0 sec or more and 6.0 sec or less. However, the specific dye is not limited to magenta, and the target range is not also limited to the above-mentioned range. It is preferable that the specific dye and the target range be appropriately changed according to a combination of the type of a dye to be used and metallic ink to be used. Specifically, the relationship between the application time difference and the color intensity as shown in FIG. 10 is determined using color inks and metallic ink to be used. In a case where there is a color ink whose color intensity changes in a relatively short time, as magenta in FIG. 10, the dye for the color ink should be set as a specific dye. Furthermore, the range of the application time difference such that the variation (unevenness) of the color intensity of the specific dye cannot be visually confirmed should be defined as the target range.

In addition, although three colors of cyan, magenta, and yellow are prepared as color inks in the above embodiments, black ink may be additionally used. In this case, in the sequence of image processing described with reference to FIG. 5, the color separation unit 502 should convert 8-bit R'G'B' data into 8-bit C, M, Y, K data.

The present invention may be implemented by performing processing of supplying a program that implements one or more functions of the above-described embodiments to a system or apparatus via a network or a storage medium, and allowing one or more processors in a computer of the system or apparatus to load thereinto and execute the program. The present invention may also be implemented by a circuit (e.g., ASIC) that implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113068, filed Jun. 13, 2018, which is hereby incorporated by reference wherein in its entirety.

What is claimed is:

1. An inkjet printing method comprising:
   a first printing step of, by using a print head including a printing element for applying metallic ink containing metal particles and a printing element for applying a first color ink containing a color material of a dye, based on image data including a color metallic image, applying metallic ink to a color metallic area where the color metallic image on a print medium having a receiving layer containing a dye coagulating agent for coagulating a dye is formed, while moving the print head in a main-scanning direction;
   a conveyance step of, after the first printing step, conveying the print medium by a predetermined distance in a conveyance direction crossing the main-scanning direction; and
   a second printing step of, after the conveyance step, applying a first color ink to the color metallic area while moving the print head in the main-scanning direction, wherein
   an application time difference until application of a first color ink to the color metallic area in the second printing step after application of metallic ink to the color metallic area in the first printing step is included in a target range regardless of the image data.

2. The inkjet printing method according to claim 1, wherein the target range is a range of the application time difference which is suitable for color material of dye contained in a first color ink to be coagulated by dye coagulating agent on a top layer of a metallic layer formed on a top surface of the print medium by metallic ink to thereby form a colored layer.

3. The inkjet printing method according to claim 1, wherein the application time difference is provided in such a way as to be included in the target range by adjusting a number of print scannings not involving ejection of ink, which is executed after execution of the first printing step on the color metallic area until the second printing step is executed thereon.

4. The inkjet printing method according to claim 1, wherein the application time difference is provided by causing the print head to pause between the first printing step and the second printing step.

5. The inkjet printing method according to claim 1, wherein the application time difference is adjusted by at least one of a scanning distance or a scanning speed of the print head in the first printing step.

6. The inkjet printing method according to claim 1, wherein
   a first color ink is magenta ink.

7. The inkjet printing method according to claim 1, wherein
   the target range of the application time difference is 2.0 sec or more and 6.0 sec or less.

8. The inkjet printing method according to claim 1, wherein
   the print head further includes a printing element for applying a second color ink containing a color material different from that of a first color ink,
   the application time difference when a first color ink is applied to the color metallic area in the first printing step is set equal to or greater than a time A and equal to or less than a time B (where time A<time B), and
   the application time difference when a second color ink is applied to the color metallic area without application of a first color ink in the first printing step is set equal to or greater than a time C.

9. The inkjet printing method according to claim 8, wherein
   the time A is 2.0 sec, and the time B is 6.0 sec.

10. The inkjet printing method according to claim 8, wherein a second color ink is either cyan ink or yellow ink.

11. The inkjet printing method according to claim 1, wherein metal particles contained in metallic ink are silver particles.

12. An inkjet printing apparatus comprising:
   a conveyance unit configured to be capable of conveying a print medium having a receiving layer containing a dye coagulating agent for coagulating a dye;
   a print head configured to include a printing element for applying metallic ink containing metal particles and a printing element for applying color ink containing a color material of a dye; and
   a control unit configured to control operation of printing an image with the print head and the conveyance unit in such a way that, based on image data including a color metallic image, after the metallic ink is applied to an area on the print medium where the color metallic image is formed through a first print scan, color ink is applied to the area through a second print scan, and that an application time difference between execution of the first print scan and execution of the second print scan is included in a target range regardless of the image data.

* * * * *